US010544385B2

(12) United States Patent
Saerens et al.

(10) Patent No.: US 10,544,385 B2
(45) Date of Patent: Jan. 28, 2020

(54) **ENHANCEMENT OF BEER FLAVOR BY A COMBINATION OF *PICHIA* YEAST AND DIFFERENT HOP VARIETIES**

(71) Applicant: Chr. Hansen A/S, Hoersholm (DK)

(72) Inventors: Sofie Saerens, Meerbeke (BE); Jan Hendrik Swiegers, Fredensborg (DK)

(73) Assignee: CHR. HANSEN A/S, Hoersholm (DK)

( * ) Notice: Subject to any disclaimer, the term of this patent is extended or adjusted under 35 U.S.C. 154(b) by 169 days.

(21) Appl. No.: 15/348,576

(22) Filed: Nov. 10, 2016

(65) Prior Publication Data

US 2017/0183612 A1    Jun. 29, 2017

Related U.S. Application Data

(63) Continuation of application No. 14/241,761, filed as application No. PCT/EP2012/067076 on Sep. 3, 2012, now abandoned.

(30) Foreign Application Priority Data

Sep. 2, 2011 (EP) ..................................... 11179862

(51) Int. Cl.
| | | |
|---|---|---|
| C12C 11/00 | (2006.01) | |
| C12C 12/00 | (2006.01) | |
| C12C 7/20 | (2006.01) | |
| C12C 7/28 | (2006.01) | |
| C12C 12/04 | (2006.01) | |

(52) U.S. Cl.
CPC ............ *C12C 11/003* (2013.01); *C12C 7/205* (2013.01); *C12C 7/287* (2013.01); *C12C 12/006* (2013.01); *C12C 12/04* (2013.01)

(58) Field of Classification Search
CPC ....... C12C 11/003; C12C 5/026; C12C 7/287; C12C 11/00; C12C 12/00; C12C 12/006; C12C 12/02; C12C 12/04; C12C 5/00; C12R 1/86; C12R 1/865
USPC .............. 426/534, 11, 16, 442, 590, 13, 592
See application file for complete search history.

(56) References Cited

U.S. PATENT DOCUMENTS

| 6,013,288 A | 1/2000 | Shibano et al. |
|---|---|---|
| 2010/0047386 A1 | 2/2010 | Tatera |

FOREIGN PATENT DOCUMENTS

| CN | 102051289 A | 5/2011 |
|---|---|---|
| DE | 288619 A5 | 4/1991 |
| JP | 2006-197840 A | 8/2006 |
| WO | WO-2008/077986 | 7/2008 |
| WO | WO-2009/110807 A1 | 9/2009 |
| WO | WO-2011/078642 A2 | 6/2011 |

OTHER PUBLICATIONS

Anfang et al., "Co-fermentation with Pichia Kluyveri increases varietal thiol concentrations in Sauvignon Blanc," Australian Journal of Grape and Wine Research, 15: 1-8 (Jan. 2009).
Daenen L, et al., "Screening and evaluation of the glucoside hydrolase activity in *Saccharomyces* and Brettanomyces brewing yeasts," J Appl. Microbiol., 104:478-488 (Oct. 2008).
Domizio P, et al. (2011) Outlining a future for non-*Saccharomyces* yeasts: selection of putative spoilage wine strains to be used in combination with *Saccharomyces cerevisiae* for grape juice fermentation. Int J Food Microbiol. 147:170-80.
Hornsey, "Hops," Chapter 3 in Brewing 58-84 (Nov. 1999), available at http://pubs.rsc.org/doi:10.1039/9781847550286-00058.
International Search Report dated Nov. 23, 2012 issued in Application No. PCT/EP2012/067076.
King AJ, and Dickinson RJ., "Biotransformation of hop aroma terpenoids by ale and lager yeasts," FEMS Yeast Res 3:53-62 (Mar. 2003).
Saerens SM, et al., "Genetic improvement of brewer's yeast: current state, perspectives and limits," Appl. Microbiol. Biotechnol., 86: 1195-1212 (May 2010).
Takoi K, et al., "Biotransformation of hop-derived monoterpene alcohols by lager yeast and their contribution to the flavour of hopped beer," J. Agric. Food. Chem. 58: 5050-5058 (Apr. 2010).
Verachtert H, et al., "Yeast in mixed cultures with emphasis on lambic beer brewing," in Yeast-Biotechnology and Biocatalysis 429-478 (Verachtert H & De Mot R eds., 1989).
Verstrepen KJ, et al., "Flavor-active esters: adding fruitiness to beer," J. Biosci. Bioeng., 96: 110-118 (Dec. 2003).
Written Opinion issued in Application No. PCT/EP2012/067076 dated Nov. 23, 2012.
Zufall C & Wackerbauer K, "Process engineering parameters for the dealcoholisation of beer by means of falling film evaporation and its influence on beer quality," Monatsschrift für Brauwissenschaft, 53:124-137 (May 2000).
USPTO Non-Final Office Action issued in U.S. Appl. No. 14/241,761 (US 2014-0234480) dated Oct. 27, 2015.
USPTO Final Office Action issued in U.S. Appl. No. 14/241,761 (US2014-0234480) dated May 13, 2016.

(Continued)

*Primary Examiner* — Vera Stulii
(74) *Attorney, Agent, or Firm* — Foley & Lardner LLP

(57) ABSTRACT

It has unexpectedly been found that *Pichia* spp. strains have advantageous properties useful in the beer fermentation process. In particular, *Pichia* spp. yeast strains can be combined with normal beer yeast strains and different hop varieties in a fermentation process to produce synergistic effects—namely, the increased production of esters in the fermentation product. More specifically, the yeast can be used to produce increased levels of isoamyl acetate, isobutyl acetate, ethyl propionate, ethyl valerate, ethyl butyrate, ethyl decanoate and ethyl octanoate in beer. In addition, the *Pichia* spp. strain interacts differently with different hop varieties, so the flavor profile of beer can be tuned by using different combinations of *Pichia* spp. strains and hops. The present invention relates to a method of brewing beer using a *Pichia* spp. yeast strain and at least one hop variety, a beer obtainable by such a method and use of a *Pichia* spp. yeast strain according to the present invention.

12 Claims, 16 Drawing Sheets

(56) References Cited

OTHER PUBLICATIONS

Kishimoto, "Hop-Derived Odorants Contributing to the Aroma Characteristics of Beer," *Journal of the Brewing Society of Japan*, pp. 157-169 (2009).
Office action dated Dec. 29, 2014 issued in Chinese Application No. 2012800428136.
Viana, F., et al., "Rational selection of non-*Saccharomyces* wine yeasts for mixed starters based on ester formation and enological traits," Food Microbiology, 25: 778-785 (May 2008).

ENHANCEMENT OF BEER FLAVOR BY A COMBINATION OF *PICHIA* YEAST AND DIFFERENT HOP VARIETIES

FIELD OF THE INVENTION

The present invention relates to the field of beer brewing and enhancement of beer flavor. Specifically, the invention relates to a method of brewing beer comprising a step of fermentation of a hopped wort with a *Pichia* spp. (species), where there is an interaction of the hops with the *Pichia* spp. yeast strain to enhance the flavor of beer.

BACKGROUND OF THE INVENTION

Various beers contain many flavor compounds derived from barley malts, hops, yeast fermentation and other raw materials. However, yeast fermentation forms the core of the beer brewing process, as during fermentation the most important flavor compounds are formed. Fermentation is a process in which yeast metabolizes simple sugars in the wort into ethanol and carbon dioxide. However, these components make a relatively minor contribution to the overall beer flavor. The aroma and flavor characteristics of beer result from the minor flavor volatiles produced by yeast during fermentation.

Another important factor is the hop. There are two kinds of hops used in the brewery: bitter hops and aroma hops. Bitter hops are used for lager beers to give extra bitterness to the beer. Aroma hops are used for specialty beers to enhance the flavor.

The use of starter cultures is a common practice in yeast industries. However, a pure yeast strain often does not combine all optimal traits desired in brewing, as there are two major objectives for using specific yeast strains in the beer industry: improving the efficiency of the production process and obtaining a good quality of the final product (Saerens et al. 2010).

An additional, more recent trend in the food and beverage industry is the production of beverages that support human health. For example, brewing industry has invested in research focused on production of beers with less alcohol and sugar.

To ensure a good quality of beer, the reduction of "bad" flavors and the enhancement of desirable flavors have been an important issue in the brewing industry. Reduction of bad flavors is focused on a low production of diacetyl, an undesirable flavor compound in beer with a 'butterscotch' aroma. The most desirable flavor compounds in beer are esters and higher alcohols, giving a fruity aroma to the beer (Verstrepen et al. 2003). The most important flavor-active esters in beer are acetate esters, such as ethyl acetate ("solvent"-like aroma) and isoamyl acetate ("banana" aroma), and ethyl esters, such as ethyl hexanoate and octanoate ("apple" aroma). The most important higher alcohol is isoamyl alcohol ("banana" aroma).

Due to the increasing demand for healthier food and beverages, the reduction of ethanol and carbohydrates in alcoholic beverages, especially beer and wine, is of considerable commercial interest. Current production methods of low-alcohol, reduced-alcohol and non-alcohol beer, i.e. modified fermentation or post-fermentation removal of ethanol, result in either a wort-like taste or a loss of aroma components, respectively (Zufall and Wackerbauer 2000). In an alcohol-free lager beer, the absence of ethanol (les than 0.1%) strengthens any "worty" off-flavors in beers produced by a cold contact process.

An improvement of the organoleptic quality of beverages and the development of new beverages can be attained through bioflavoring (Vanderhaegen et al. 2003). This technique relies on the production and conversion of flavor compounds and flavor precursors by biological methods, such as the use of special yeast strains. Traditionally, brewers have distinguished two types of brewer's yeast: ale and lager yeast, according to their use for the production of ales and lagers, respectively. Ale and lager brewer's yeasts belong to the genus *Saccharomyces*: *S. cerevisiae* (ale yeast) and *S. pastorianus* (lager yeast). Lager yeast is used for the production of pilsner beers, which comprises 90% of the beers produced in the world. The other 10% are specialty beers, produced by ale yeast. In Belgium (and now also in USA) one other yeast species is used for the production of lambic and gueuze beers, *Brettanomyces bruxellensis* (Verachtert et al. 1989). This is in huge contrast to the wine industry, where a lot of non-*Saccharomyces* strains are used to enhance the 'wild' character of spontaneous fermentations (Domizio et al. 2011). These strains are today commercially available for the wine industry through companies such as Christian Hansen and Lallemand.

International patent application WO 2009/110807 is related to yeast strains for use in fermentation processes and to a method of enhancing flavor in a product of fermentation by use of a non-*Saccharomyces* yeast strain. WO 2009/110807 relates to fermentation of wine and does not mention use of non-*Saccharomyces* species in brewing of beer.

No studies have examined the effects of non-*Saccharomyces* species on the level of esters and higher alcohols in beer. Also only a few studies report on the influence of yeast on hop flavor in beer. Three studies so far report the influence of either *Saccharomyces* species or *Brettanomyces* species on the enhancement of hop terpenoids in beer (King and Dickinson, 2003, Daenen et al. 2007 and Takoi et al. 2010).

International patent application WO 2008/077986 describes a process for producing alcoholic beverages with increased and/or different aromatic terpene content by using genetically modified microorganisms expressing genes which code for monoterpene synthase during fermentation. In this WO 2008/077986 *Pichia* is mentioned in a list of theoretically possible yeast strains (together with other yeast strains such as e.g. *Saccharomyces*) for fermenting alcoholic beverages (beer is mentioned as an example together with other alcoholic beverages such as wine, cava, champagne, cider and sake). In other words use of *Pichia* spp. for making of beer is not exactly and unambiguously disclosed in WO 2008/077986.

German patent DD 288619 A5 describes the use of *Pichia* yeast to ferment beer wort. The beer wort is not added hops.

An understanding of the biological processes that control the presence and amount of compounds in a fermentation process is highly desirable. In particular, being able to regulate the amount and type of acetate esters in beer would be very beneficial to brewers. Regulation of the amount of esters and higher alcohols, and in particular isoamyl acetate, in combination with hop flavors in beer would allow for the development of new technologies permitting the brewers to more precisely alter the amounts of these desirable flavors in their product. Such a technology would, therefore, be of significant commercial value. In addition to that, flavor enhancement can be a useful way to produce low-alcohol, reduced-alcohol or non-alcohol beers. The problem with production of low-alcohol, reduced-alcohol or non-alcohol beers is the wort-like taste or loss of aroma compounds, either because of removal of the ethanol or because of the low density of the wort.

Thus, there exists a need for improved processes for enhancement of desirable flavors in beer.

SUMMARY OF THE INVENTION

The problem to be solved by the present invention relates to the provision of a new method for brewing beer wherein the presence of desirable flavor compounds, such as esters and higher alcohols, is enhanced.

The solution is based on the surprising findings by the inventors that by using a method comprising fermenting hopped wort with a *Pichia* spp. yeast strain prior to or at the same time as fermentation of the hopped wort with a conventional brewer's yeast one is able to produce a beer with an improved flavor profile.

Accordingly, a first aspect of the invention relates to a method of brewing beer comprising the steps of:
 a) providing a wort;
 b) adding at least one hop variety to obtain a hopped wort;
 c) fermenting the hopped wort with a first yeast strain, wherein the first yeast strain is a *Pichia* spp. yeast strain; and
 d) fermenting the hopped wort with a second yeast strain to obtain a beer, wherein the second yeast strain belongs to the group consisting of *Saccharomyces* species and *Brettanomyces* species.

A second aspect of the present invention relates to a beer obtainable by the method according to the first aspect of the invention.

A third aspect of the present invention relates to use of a *Pichia* species for enhancement of beer flavor.

A fourth aspect of the present invention relates to use of a *Pichia* species for brewing of beer.

DETAILED DESCRIPTION OF THE INVENTION

Definitions

Figure 1:
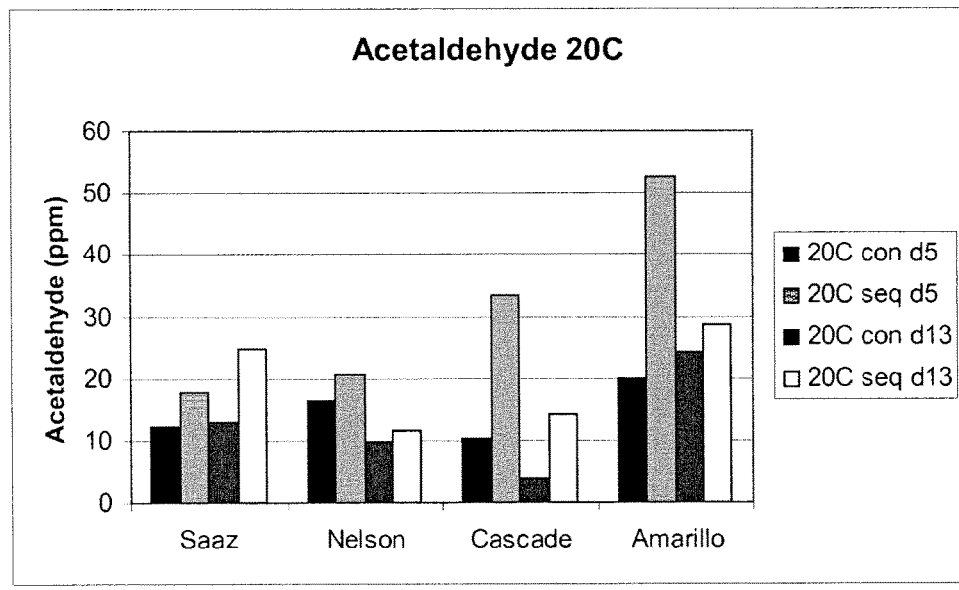
FIG. 1 illustrates acetaldehyde concentrations in fermentation products of sequential and control fermentations at 20° C., taken at day 5 (d5) and day 13 (d13). Con=control fermentation and seq=sequential fermentation.

The term "wort" herein has the conventional meaning in the art and refers to the sugary liquid extracted from the mashing process of beer brewing.

The term "beer" as used herein refers at least to beers prepared from mashes prepared from malted cereals as well as mashes prepared from unmalted cereals, and mashes prepared from a mixture of malted and unmalted cereals. The term "beer" also refers to beers prepared with adjuncts and beers with all possible alcohol contents.

The term "reduced-alcohol beer" herein refers to a beer with an alcohol content of between 1.2% to 4.2% alcohol by volume (ABV).

The term "low-alcohol beer" herein refers to a beer with an alcohol content of between 0.5% to 1.2% ABV.

The term "non-alcohol beer" herein refers to a beer with an alcohol content of less than 0.5% ABV.

The term "hopped wort" herein refers to a wort whereto hops have been added either prior to boiling or after boiling of the wort.

The term "genetically modified organism" herein has the meaning as defined by the 1996 Organic Trade Association and refers to an organism, such as a microorganism, such as yeast, which have been made with techniques that alter the molecular or cell biology of an organism by means that are not possible under natural conditions or processes.

The term "non-genetically modified" herein refers to a microorganism which does not contain heterologous genes.

In the present context, the term "mutant" should be understood as a strain derived from a strain of the invention by means of e.g. genetic engineering, radiation and/or chemical treatment. It is preferred that the mutant is a functionally equivalent mutant, e.g. a mutant that has substantially the same, or improved, properties (e.g. regarding enhancement of desirable beer flavor compounds) as the mother strain. Such a mutant is a part of the present invention. Especially, the term "mutant" refers to a strain obtained by subjecting a strain of the invention to any conventionally used mutagenization treatment including treatment with a chemical mutagen such as ethane methane sulphonate (EMS) or N-methyl-N'-nitro-N-nitroguanidine (NTG), UV light or to a spontaneously occurring mutant. A mutant may have been subjected to several mutagenization treatments (a single treatment should be understood one mutagenization step followed by a screening/selection step), but it is presently preferred that no more than 20, or no more than 10, or no more than 5, treatments (or screening/selection steps) are carried out. In a presently preferred mutant, less that 5%, or less than 1% or even less than 0.1% of the nucleotides in the yeast genome have been shifted with another nucleotide, or deleted, compared to the mother strain.

In the present context, the term "variant" should be understood as a strain which is functionally equivalent to a strain of the invention, e.g. having substantially the same, or improved, properties (e.g. regarding enhancement of desirable beer flavor compounds).

Such variants, which may be identified using appropriate screening techniques, are a part of the present invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Implementation and Aspects of the Invention

The process of brewing beer is well known to the skilled person and can be outlined in the following way; malt is prepared from dried, germinated cereal grains (mainly barley or wheat) and grounded into a grist which may contain unmalted adjuncts. The grist is mashed (mixed with water and steeped) to allow enzymes in the malt to convert the starch into sugars. The grain particles and adjuncts are separated from the liquid wort in a process called lautering. The malt making and mashing steps can be skipped by adding water to malt extract. After addition of hops and/or other ingredients such as herbs and sugars, the wort is boiled (hops may also be added after boiling), cooled and aerated. The wort is then moved to a fermentation tank and fermented by the addition of a brewer's yeast. The primary fermentation, lasting typically 5 to 10 days, may be followed by a secondary fermentation step using a further brewer's yeast. After fermentation the fresh beer or "green" beer, is conditioned, optionally filtrated and carbonated.

Hops are added to the wort to balance the sweetness of the malt with bitterness and impart onto the beer desirable flavors and aromas. Several varieties exist including but not limited to Ahtanum, Amarillo, Apollo, Cascade, Centennial, Chinook, Citra, Cluster, Columbus, Crystal, Eroica, Galena, Glacier, Greenburg, Horizon, Liberty, Millenium, Mount Hood, Mount Rainier, Newport, Nugget, Palisade, Santiam, Simcoe, Sterling, Summit, Tomahawk, Ultra, Vanguard, Warrior, Willamette, Zeus, Admiral, Brewer's Gold, Bullion, Challenger, First Gold, Fuggles, Goldings, Herald, Northdown, Northern Brewer, Phoenix, Pilot, Pioneer, Progress, Target, Whitbread Golding Variety (WGV), Hallertau, Hersbrucker, Saaz, Tettnang, Spalt, Feux-Coeur Francais, Galaxy, Green Bullet, Motueka, Nelson Sauvin, Pacific Gem, Pacific Jade, Pacifica, Pride of Ringwood, Riwaka, Southern Cross, Lublin, Magnum, Perle, Polnischer Lublin, Saphir, Satus, Select, Strisselspalt, Styrian Goldings, Tardif de Bourgogne and Tradition. Further varieties exist including but not limited to Bravo, Calypso, Chelan, Comet, El Dorado, San Juan Ruby Red, Satus, Sonnet Golding, Super Galena, Tillicum, Bramling Cross, Pilgrim. Hallertauer Herkules, Hallertauer Magnum, Hallertauer Taurus, Merkur, Opal, Smaragd, Halleratau Aroma, Kohatu, Rakau, Stella, Sticklebract, Summer Saaz, Super Alpha, Super Pride, Topaz, Wai-iti, Bor, Junga, Marynka, Premiant, Sladek, Styrian Atlas, Styrian Aurora, Styrian Bobek, Styrian Celeia, Sybilla and Sorachi Ace.

The inventors of the present invention have unexpectedly found that certain *Pichia* spp. yeast strains, when combined with the addition of different varieties of hops to the wort, have advantageous properties useful in the fermentation process of beer brewing. In particular, the *Pichia* spp. yeast strains enhance desirable flavors from the hops when the hopped wort is fermented with the *Pichia* spp. yeast strains in sequence to fermentation of the hopped wort with a yeast strain conventionally used for beer brewing, including yeasts of the genera *Saccharomyces* and *Brettanomyces*.

From the complete flavor analysis of all the fermentations outlined in the Examples below, it is clear that almost every compound measured was present in higher concentrations in the sequential fermentations, compared to the control fermentations. This means that the *Pichia* spp. strain has a huge effect on the flavor profile of the final beer, as addition of *Pichia* spp. in the beginning of fermentation was the only difference between the sequential and the control fermentations. As huge increases were found for all desirable flavor compounds, such as isoamyl and isobutyl acetate and ethyl propionate and valerate, this shows an enormous potential of using *Pichia* spp. in the brewing industry. Especially for low-alcohol, reduced-alcohol and non-alcohol beers, the enhancement of fruity flavors can mask the worty flavors normally present. As this is an emerging market, huge potential is available for the use of *Pichia* spp. in these beer fermentations.

The method for brewing beer of the present invention comprises the steps of:
a) providing a wort;
b) adding at least one hop variety to obtain a hopped wort;
c) fermenting the hopped wort with a first yeast strain, wherein the first yeast strain is a *Pichia* spp. yeast strain; and
d) fermenting the hopped wort with a second yeast strain to obtain a beer, wherein the second yeast strain belongs to the group consisting of *Saccharomyces* species and *Brettanomyces* species.

By this method one can enhance the flavor compounds and optimize the flavor profile of the beer by adding different varieties of hops as shown in the Examples.

In one preferred embodiment of the present invention step c) and step d) are carried out sequentially, i.e. the hopped wort is inoculated first with a *Pichia* spp. yeast strain under conditions suitable for fermentation and subsequently the hopped wort is inoculated with a second yeast strain under conditions suitable for fermentation.

In a more preferred embodiment the fermentation in step c) is allowed to proceed for at least 12 hours, such as for at least 24 hours, such as for at least 36 hours, such as for at least 48 hours, such as for at least 60 hours, such as at least 72 hours prior to inoculation of the second yeast strain in step d). In a most preferred embodiment the fermentation in step c) is allowed to proceed for at least 36 hours.

It is part of the present invention that different flavor profiles of beer can be achieved by using the different varieties of hops. The at least one variety of hop may be selected from the list consisting of Ahtanum, Amarillo, Apollo, Cascade, Centennial, Chinook, Citra, Cluster, Columbus, Crystal, Eroica, Galena, Glacier, Greenburg, Horizon, Liberty, Millenium, Mount Hood, Mount Rainier, Newport, Nugget, Palisade, Santiam, Simcoe, Sterling, Summit, Tomahawk, Ultra, Vanguard, Warrior, Willamette, Zeus, Admiral, Brewer's Gold, Bullion, Challenger, First Gold, Fuggles, Goldings, Herald, Northdown, Northern Brewer, Phoenix, Pilot, Pioneer, Progress, Target, Whitbread Golding Variety (WGV), Hallertau, Hersbrucker, Saaz, Tettnang, Spalt, Feux-Coeur Francais, Galaxy, Green Bullet, Motueka, Nelson Sauvin, Pacific Gem, Pacific Jade, Pacifica, Pride of Ringwood, Riwaka, Southern Cross, Lublin, Magnum, Perle, Polnischer Lublin, Saphir, Satus, Select, Strisselspalt, Styrian Goldings, Tardif de Bourgogne and Tradition, but use of further varieties of hops is also part of the invention.

In a preferred embodiment the at least one hop variety is selected from the group consisting of Saaz, Nelson Sauvin, Cascade and Amarillo.

The at least one variety of hop may also be selected from the list consisting of Bravo, Calypso, Chelan, Comet, El Dorado, San Juan Ruby Red, Satus, Sonnet Golding, Super Galena, Tillicum, Bramling Cross, Pilgrim. Hallertauer Herkules, Hallertauer Magnum, Hallertauer Taurus, Merkur, Opal, Smaragd, Halleratau Aroma, Kohatu, Rakau, Stella, Sticklebract, Summer Saaz, Super Alpha, Super Pride, Topaz, Wai-iti, Bor, Junga, Marynka, Premiant, Sladek, Styrian Atlas, Styrian Aurora, Styrian Bobek, Styrian Celeia, Sybilla and Sorachi Ace.

In another preferred embodiment of the present invention the fermentation in step c) is carried out at a temperature of between about 12° C. and about 28° C.

In a more preferred embodiment the fermentation temperature in step c) is between about 20° C. and about 22° C. Most preferably the fermentation temperature in step c) is about 20° C.

Preferably, the *Pichia* spp. yeast strain is left in the fermentation culture during fermentation with the second yeast strain. However, the *Pichia* spp. yeast strain may also be removed prior to inoculation of the second yeast strain by techniques known to the skilled person.

In another embodiment of the present invention step c) and step d) are carried out at the same time by co-inoculation of the first yeast strain of step c) and the second yeast strain of step d).

In a preferred embodiment the second fermentation step in step d) is allowed to proceed for at least 12 hours, such as at least 24 hours, such as at least 48 hours, such as at least 72 hours, such as at least 96 hours, such as at least 120 hours.

In a preferred embodiment of the present invention the *Pichia* spp. yeast strain is a non-genetically modified yeast strain.

In another preferred embodiment of the present invention the *Pichia* spp. yeast strain is a *Pichia kluyveri* yeast strain.

Preferably, the *Pichia kluyveri* yeast strain is selected from the group consisting of the *Pichia kluyveri* PK-KR1 and PK-KR2 strains as deposited on 24 Aug. 2006 at the National Measurement Institute, 541-65 Clarke Street, South Melbourne, Victoria 3205, Australia, by University of Auckland, School of Biological Sciences, Auckland 1142, New Zealand, and given the accession numbers V06/022711 and V06/022712, respectively, and mutants and variants thereof. The strains are described in international patent application WO 2009/110807.

In yet another preferred embodiment of the present invention the second yeast strain is selected from the group consisting of *Saccharomyces cerevisiae, Saccharomyces pastorianus* and *Brettanomyces bruxellensis*. Preferably, the second yeast strain is a *Saccharomyces cerevisiae* yeast strain.

In a preferred embodiment of the present invention the beer is a low-alcohol, reduced-alcohol or non-alcohol beer.

In another preferred embodiment, the use of a *Pichia* spp. yeast strain in step c) increases the content of at least one flavor compound selected from the group consisting of isoamyl acetate, isobutyl acetate, ethyl propionate, ethyl valerate, ethyl octanoate and ethyl decanoate by at least 50%, such as by at least 100%, such as by at least 150%, such as by at least 200%, such as by at least 250%, such as by at least 300%.

Preferably, the use of a *Pichia* spp. yeast strain in step c) increases the content of at least one flavor compound selected from the group consisting of isoamyl acetate, isobutyl acetate, ethyl propionate and ethyl valerate by at least 50%, such as by at least 100%, such as by at least 150%, such as by at least 200%, such as by at least 250%, such as by at least 300%.

In yet another preferred embodiment of the present invention the use a *Pichia* spp. yeast strain in step c) increases the content of at least two or more flavor compounds selected from the group consisting of isoamyl acetate, isobutyl acetate, ethyl propionate, ethyl valerate, ethyl octanoate and ethyl decanoate by at least 50%, such as by at least 100%, such as by at least 150%, such as by at least 200%, such as by at least 250%, such as by at least 300%.

Preferably, the use of a *Pichia* spp. yeast strain in step c) increases the content of at least two or more flavor compounds selected from the group consisting of isoamyl acetate, isobutyl acetate, ethyl propionate and ethyl valerate by at least 50%, such as by at least 100%, such as by at least 150%, such as by at least 200%, such as by at least 250%, such as by at least 300%.

In another much preferred embodiment the use of a *Pichia* spp. yeast strain in step c) increases the content of the thiol 3-mercaptohexyl acetate by at least 10%, such as by at least 20%, such as by at least 30%, such as by at least 40%, such as by at least 50%.

The terms "increases the content of at least one flavor compound" and "increases the content of the thiol 3-mercaptohexyl acetate" may be seen as inherent properties of using *Pichia* spp. as discussed below.

In a preferred embodiment of the present invention when the at least one hop variety in step b) is Saaz and the fermentation in step c) is carried out at a temperature of about 20° C. the use of the *Pichia* spp. yeast strain in step c) increases the level of ethyl decanoate with at least 50% more than when the at least one hop variety is Cascade, Nelson Sauvin or Amarillo.

In another preferred embodiment of the invention when the at least one hop variety in step b) is Nelson Sauvin and the fermentation in step c) is carried out at a temperature of about 20° C. the use of the *Pichia* spp. yeast strain in step c) increases the level of ethyl decanoate with at least 50% more than when the at least one hop variety is Cascade or Amarillo.

In further embodiment of the invention when the at least one hop variety in step b) is Cascade or Nelson Sauvin and the fermentation in step c) is carried out at a temperature of about 20° C. the use of the *Pichia* spp. yeast strain in step c) increases the level of ethyl valerate with at least 50% more than when the at least one hop variety is Amarillo and Saaz.

In an even further embodiment when the at least one hop variety in step b) is Cascade and the fermentation in step c) is carried out at a temperature of about 20° C. the use of the *Pichia* yeast strain in step c) increases the level of ethyl hexanoate and ethyl octanoate with at least 50% more than when the at least one hop variety is Nelson Sauvin, Amarillo or Saaz.

In yet another embodiment of the invention when the at least one hop variety in step b) is any variety selected from the group consisting of Ahtanum, Amarillo, Apollo, Cascade, Centennial, Chinook, Citra, Cluster, Columbus, Crystal, Eroica, Galena, Glacier, Greenburg, Horizon, Liberty, Millenium, Mount Hood, Mount Rainier, Newport, Nugget, Palisade, Santiam, Simcoe, Sterling, Summit, Tomahawk, Ultra, Vanguard, Warrior, Willamette, Zeus, Admiral, Brewer's Gold, Bullion, Challenger, First Gold, Fuggles, Goldings, Herald, Northdown, Northern Brewer, Phoenix, Pilot, Pioneer, Progress, Target, Whitbread Golding Variety (WGV), Hallertau, Hersbrucker, Saaz, Tettnang, Spalt, Feux-Coeur Francais, Galaxy, Green Bullet, Motueka, Nelson Sauvin, Pacific Gem, Pacific Jade, Pacifica, Pride of Ringwood, Riwaka, Southern Cross, Lublin, Magnum, Perle, Polnischer Lublin, Saphir, Satus, Select, Strisselspalt, Styrian Goldings, Tardif de Bourgogne and Tradition, the use of the *Pichia* spp. yeast strain in step c) will result in a flavor profile of levels of the flavor compounds isoamyl acetate, isobutyl acetate, ethyl propionate and ethyl valerate which is different from a flavor profile resulting from use of the *Pichia* spp. yeast strain in step c) when the hop variety in step b) is any other variety selected from the group consisting of Ahtanum, Amarillo, Apollo, Cascade, Centennial, Chinook, Citra, Cluster, Columbus, Crystal, Eroica, Galena, Glacier, Greenburg, Horizon, Liberty, Millenium, Mount Hood, Mount Rainier, Newport, Nugget, Palisade, Santiam, Simcoe, Sterling, Summit, Tomahawk, Ultra, Vanguard, Warrior, Willamette, Zeus, Admiral, Brewer's Gold, Bullion, Challenger, First Gold, Fuggles, Goldings, Herald, Northdown, Northern Brewer, Phoenix, Pilot, Pioneer, Progress, Target, Whitbread Golding Variety (WGV), Hallertau, Hersbrucker, Saaz, Tettnang, Spalt, Feux-Coeur Francais, Galaxy, Green Bullet, Motueka, Nelson Sauvin, Pacific Gem, Pacific Jade, Pacifica, Pride of Ringwood, Riwaka, Southern Cross, Lublin, Magnum, Perle, Polnischer Lublin, Saphir, Satus, Select, Strisselspalt, Styrian Goldings, Tardif de Bourgogne and Tradition.

In a further embodiment of the invention when the at least one hop variety in step b) is any variety selected from the group consisting of Ahtanum, Amarillo, Apollo, Cascade, Centennial, Chinook, Citra, Cluster, Columbus, Crystal, Eroica, Galena, Glacier, Greenburg, Horizon, Liberty, Millenium, Mount Hood, Mount Rainier, Newport, Nugget, Palisade, Santiam, Simcoe, Sterling, Summit, Tomahawk, Ultra, Vanguard, Warrior, Willamette, Zeus, Admiral, Brewer's Gold, Bullion, Challenger, First Gold, Fuggles, Goldings, Herald, Northdown, Northern Brewer, Phoenix, Pilot, Pioneer, Progress, Target, Whitbread Golding Variety (WGV), Hallertau, Hersbrucker, Saaz, Tettnang, Spalt, Feux-Coeur Francais, Galaxy, Green Bullet, Motueka, Nelson Sauvin, Pacific Gem, Pacific Jade, Pacifica, Pride of Ringwood, Riwaka, Southern Cross, Lublin, Magnum, Perle, Polnischer Lublin, Saphir, Satus, Select, Strisselspalt, Styrian Goldings, Tardif de Bourgogne, Tradition, Bravo, Calypso, Chelan, Comet, El Dorado, San Juan Ruby Red, Satus, Sonnet Golding, Super Galena, Tillicum, Bramling Cross, Pilgrim. Hallertauer Herkules, Hallertauer Magnum, Hallertauer Taurus, Merkur, Opal, Smaragd, Halleratau Aroma, Kohatu, Rakau, Stella, Sticklebract, Summer Saaz, Super Alpha, Super Pride, Topaz, Wai-iti, Bor, Junga, Marynka, Premiant, Sladek, Styrian Atlas, Styrian Aurora, Styrian Bobek, Styrian Celeia, Sybilla and Sorachi Ace, the use of the *Pichia* spp. yeast strain in step c) will result in a flavor profile of levels of the flavor compounds isoamyl acetate, isobutyl acetate, ethyl propionate and ethyl valerate which is different from a flavor profile resulting from use of the *Pichia* spp. yeast strain in step c) when the hop variety in step b) is any other variety selected from the group consisting of Ahtanum, Amarillo, Apollo, Cascade, Centennial, Chinook, Citra, Cluster, Columbus, Crystal, Eroica, Galena, Glacier, Greenburg, Horizon, Liberty, Millenium, Mount Hood, Mount Rainier, Newport, Nugget, Palisade, Santiam, Simcoe, Sterling, Summit, Tomahawk, Ultra, Vanguard, Warrior, Willamette, Zeus, Admiral, Brewer's Gold, Bullion, Challenger, First Gold, Fuggles, Goldings, Herald, Northdown, Northern Brewer, Phoenix, Pilot, Pioneer, Progress, Target, Whitbread Golding Variety (WGV), Hallertau, Hersbrucker, Saaz, Tettnang, Spalt, Feux-Coeur Francais, Galaxy, Green Bullet, Motueka, Nelson Sauvin, Pacific Gem, Pacific Jade, Pacifica, Pride of Ringwood, Riwaka, Southern Cross, Lublin, Magnum, Perle, Polnischer Lublin, Saphir, Satus, Select, Strisselspalt, Styrian Goldings, Tardif de Bourgogne, Tradition, Bravo, Calypso, Chelan, Comet, El Dorado, San Juan Ruby Red, Satus, Sonnet Golding, Super Galena, Tillicum, Bramling Cross, Pilgrim. Hallertauer Herkules, Hallertauer Magnum, Hallertauer Taurus, Merkur, Opal, Smaragd, Halleratau Aroma, Kohatu, Rakau, Stella, Sticklebract, Summer Saaz, Super Alpha, Super Pride, Topaz, Wai-iti, Bor, Junga, Marynka, Premiant, Sladek, Styrian Atlas, Styrian Aurora, Styrian Bobek, Styrian Celeia, Sybilla and Sorachi Ace.

The present invention in a second aspect relates to a beer obtainable by the method of the first aspect.

The beer according to the present invention may comprise detectable amounts of *Pichia* spp. yeast. Although, in some instances the yeast is removed from the beer after fermentation.

However, the use of *Pichia* spp. will give the beer a flavor profile different from the prior art as shown herein in the Examples, and thus the beer prepared using *Pichia* spp. and different hop varieties will itself be novel.

Figure 15:
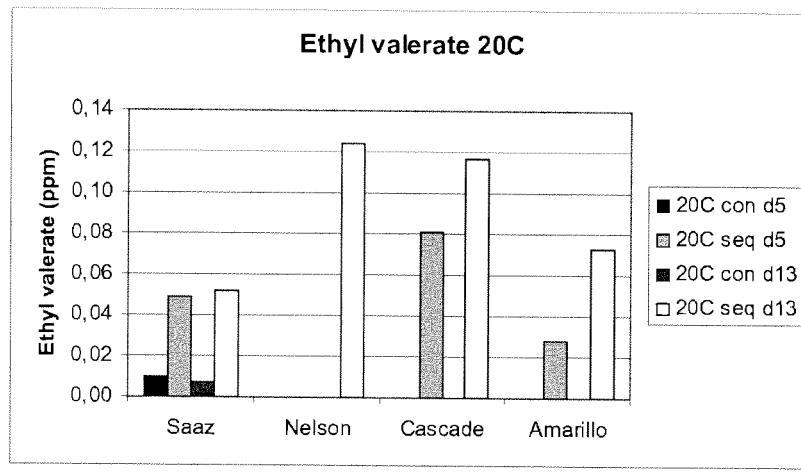
FIG. 15 illustrates ethyl valerate concentrations in fermentation products of sequential and control fermentations at 20° C., taken at day 5 (d5) and day 13 (d13). Con=control fermentation and seq=sequential fermentation.
Figure 16:
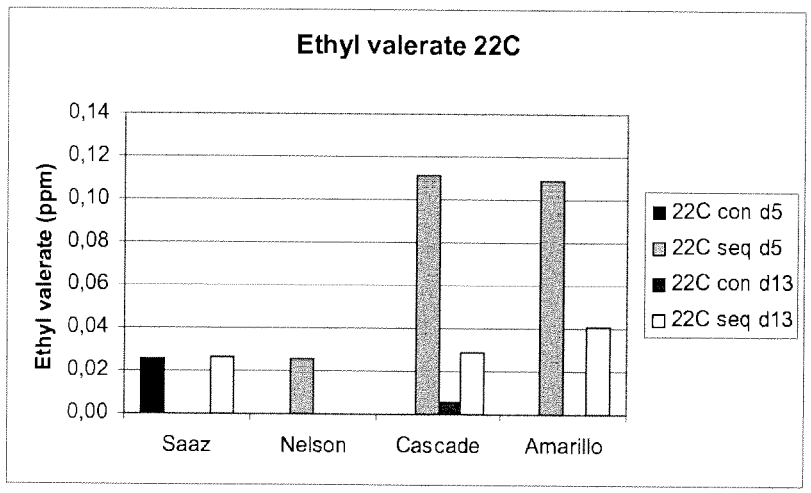
FIG. 16 illustrates ethyl valerate concentrations in fermentation products of sequential and control fermentations at 22° C., taken at day 5 (d5) and day 13 (d13). Con=control fermentation and seq=sequential fermentation.
Figure 17:
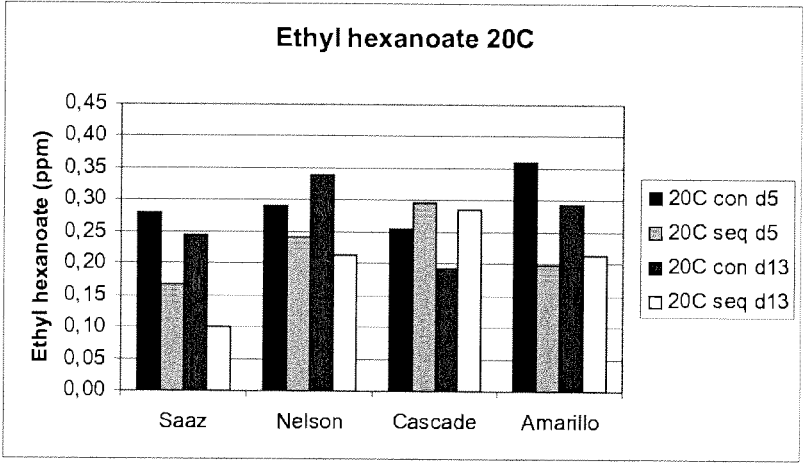
FIG. 17 illustrates ethyl hexanoate concentrations in fermentation products of sequential and control fermentations at 20° C., taken at day 5 (d5) and day 13 (d13). Con=control fermentation and seq=sequential fermentation.
Figure 18:
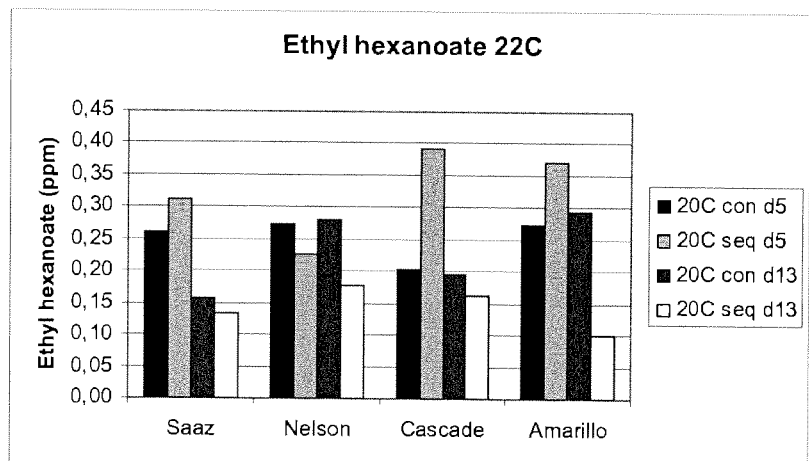
FIG. 18 illustrates ethyl hexanoate concentrations in fermentation products of sequential and control fermentations at 22° C., taken at day 5 (d5) and day 13 (d13). Con=control fermentation and seq=sequential fermentation.
Figure 19:
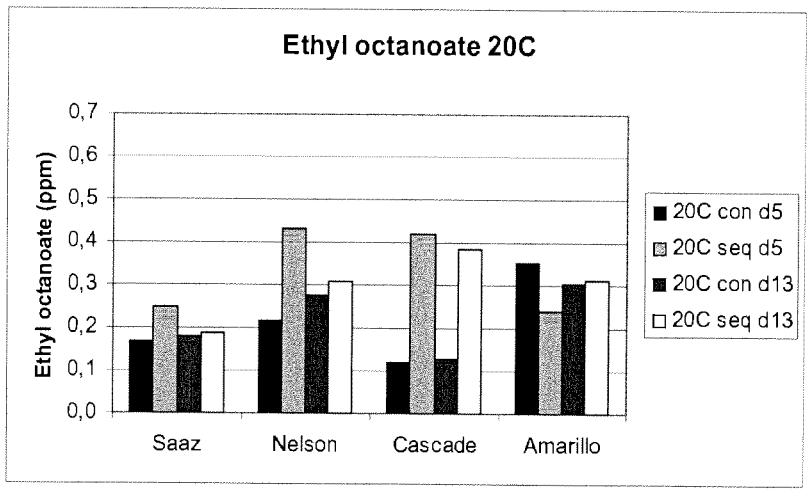
FIG. 19 illustrates ethyl octanoate concentrations in fermentation products of sequential and control fermentations at 20° C., taken at day 5 (d5) and day 13 (d13). Con=control fermentation and seq=sequential fermentation.
Figure 20:
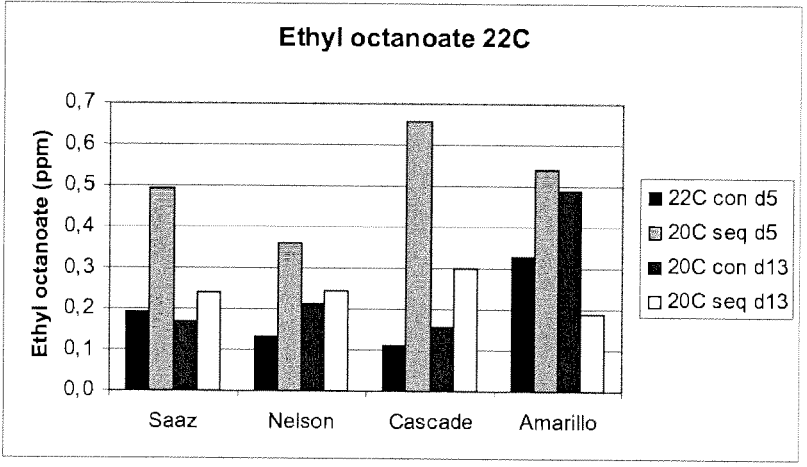
FIG. 20 illustrates ethyl octanoate concentrations in fermentation products of sequential and control fermentations at 22° C., taken at day 5 (d5) and day 13 (d13). Con=control fermentation and seq=sequential fermentation.
Figure 21:
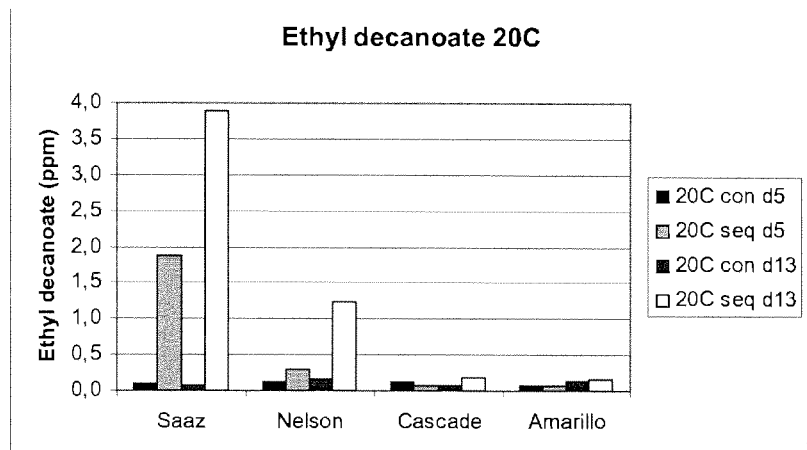
FIG. 21 illustrates ethyl decanoate concentrations in fermentation products of sequential and control fermentations at 20° C., taken at day 5 (d5) and day 13 (d13). Con=control fermentation and seq=sequential fermentation.
Figure 22:
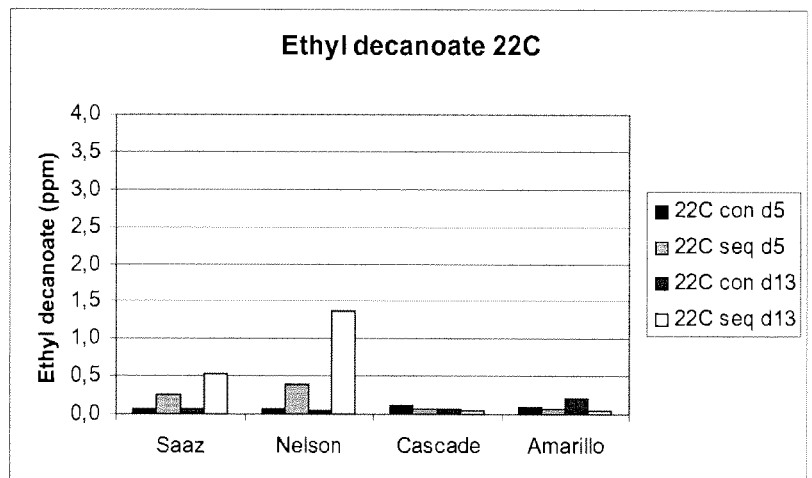
FIG. 22 illustrates ethyl decanoate concentrations in fermentation products of sequential and control fermentations at 22° C., taken at day 5 (d5) and day 13 (d13). Con=control fermentation and seq=sequential fermentation.
Figure 23:
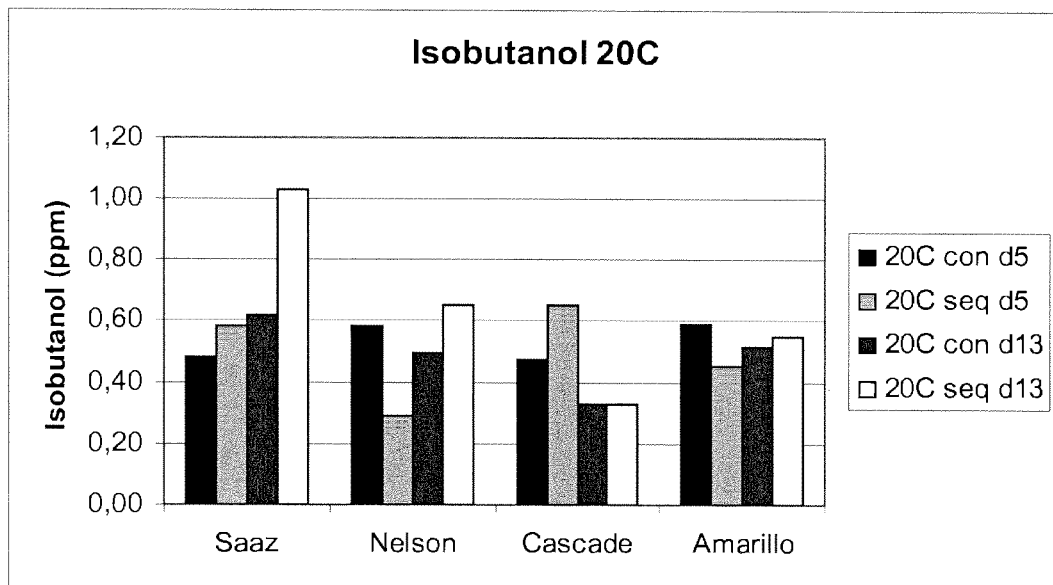
FIG. 23 illustrates isobutanol concentrations in fermentation products of sequential and control fermentations at 20° C., taken at day 5 (d5) and day 13 (d13). Con=control fermentation and seq=sequential fermentation.
Figure 24:
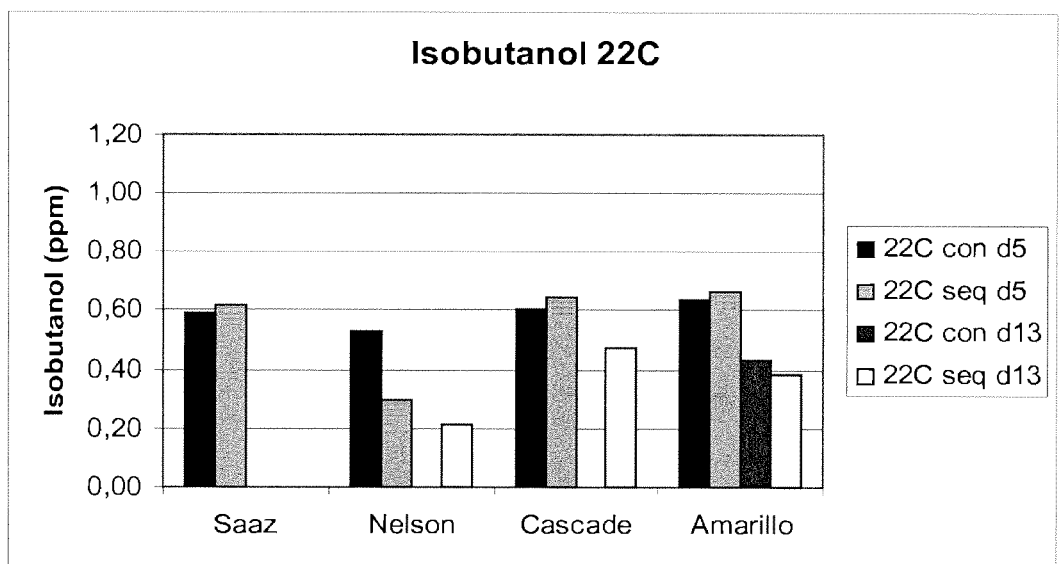
FIG. 24 illustrates isobutanol concentrations in fermentation products of sequential and control fermentations at 22° C., taken at day 5 (d5) and day 13 (d13). Con=control fermentation and seq=sequential fermentation.
Figure 25:
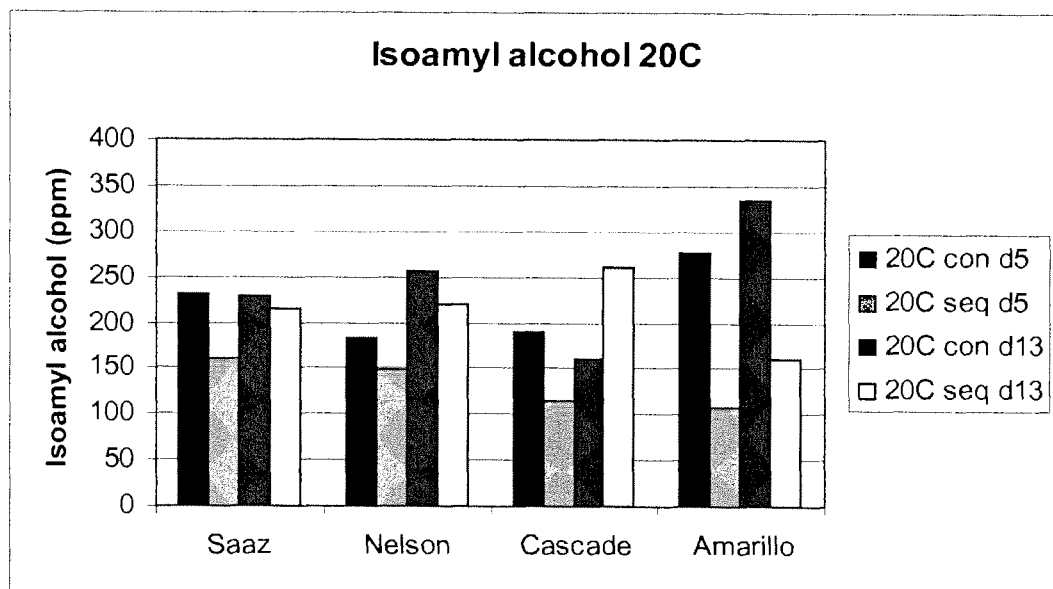
FIG. 25 illustrates isoamyl alcohol concentrations in fermentation products of sequential and control fermentations at 20° C., taken at day 5 (d5) and day 13 (d13). Con=control fermentation and seq=sequential fermentation.
Figure 26:
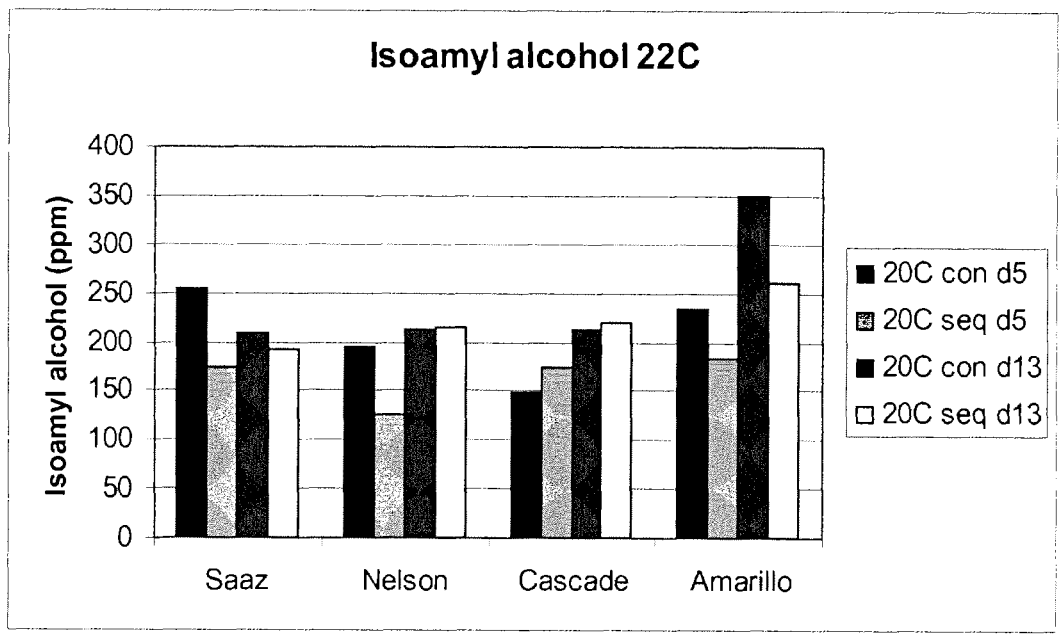
FIG. 26 illustrates isoamyl alcohol concentrations in fermentation products of sequential and control fermentations at 22° C., taken at day 5 (d5) and day 13 (d13). Con=control fermentation and seq=sequential fermentation.
Figure 27:
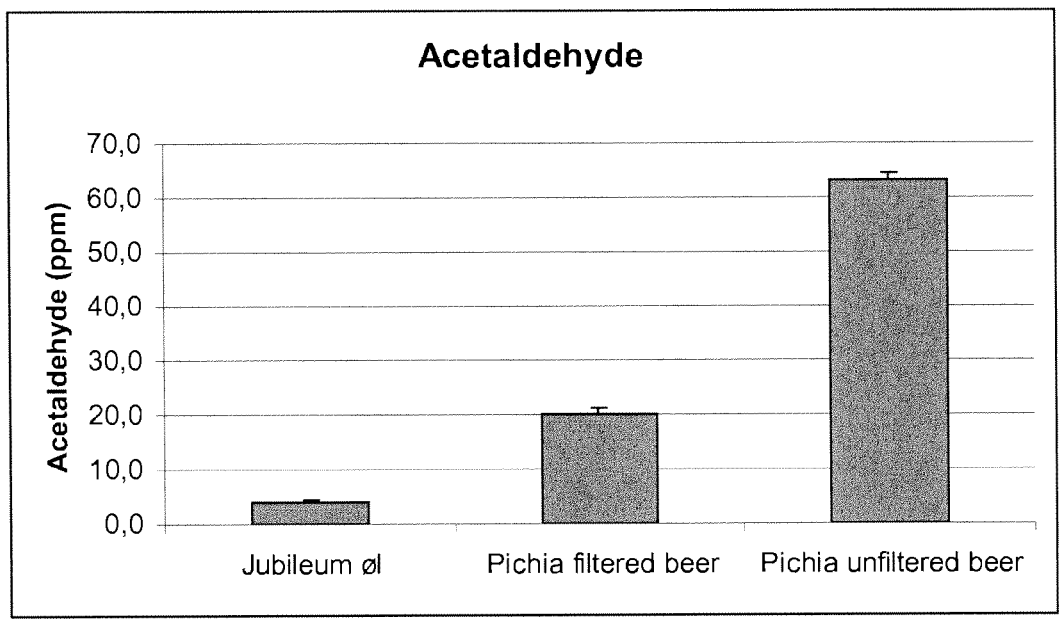
FIG. 27 illustrates acetaldehyde concentrations in finished beers.
Figure 28:
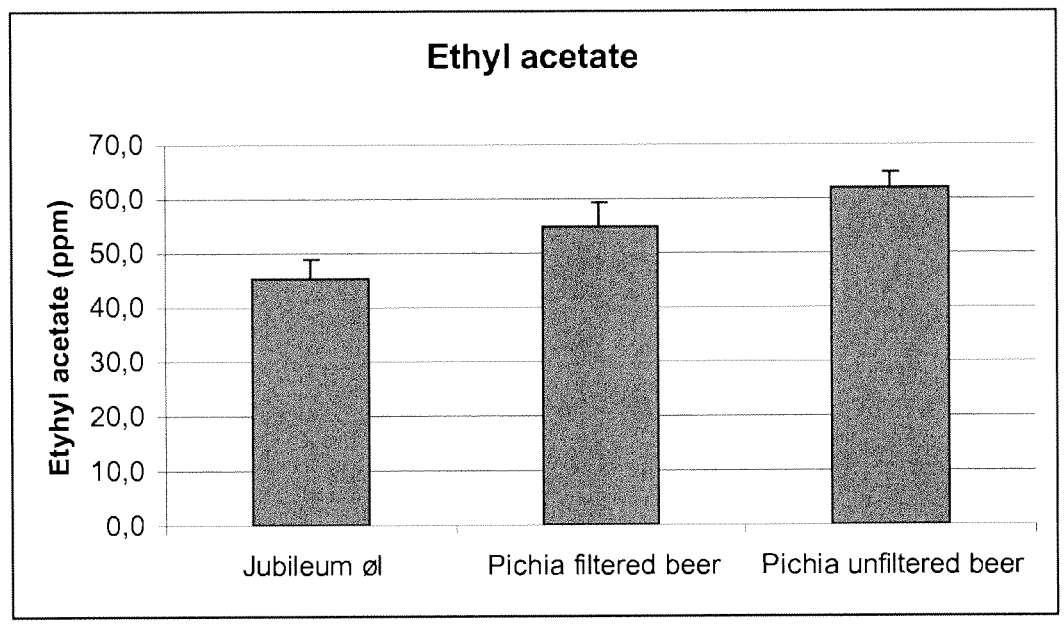
FIG. 28 illustrates ethyl acetate concentrations in finished beers.
Figure 29:
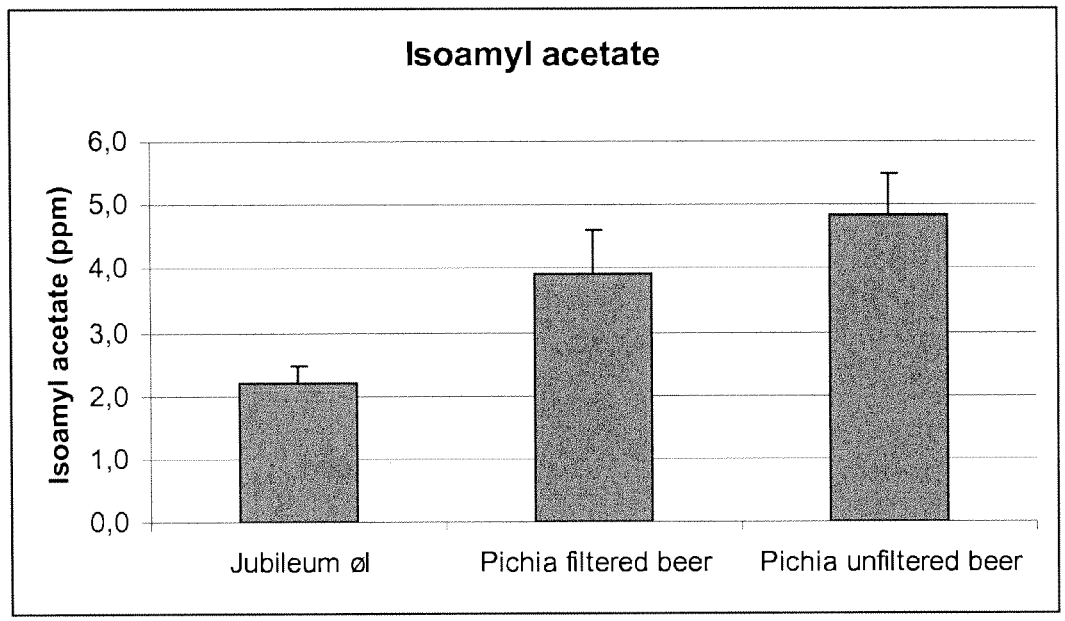
FIG. 29 illustrates isoamylacetate concentrations in finished beers.
Figure 30:
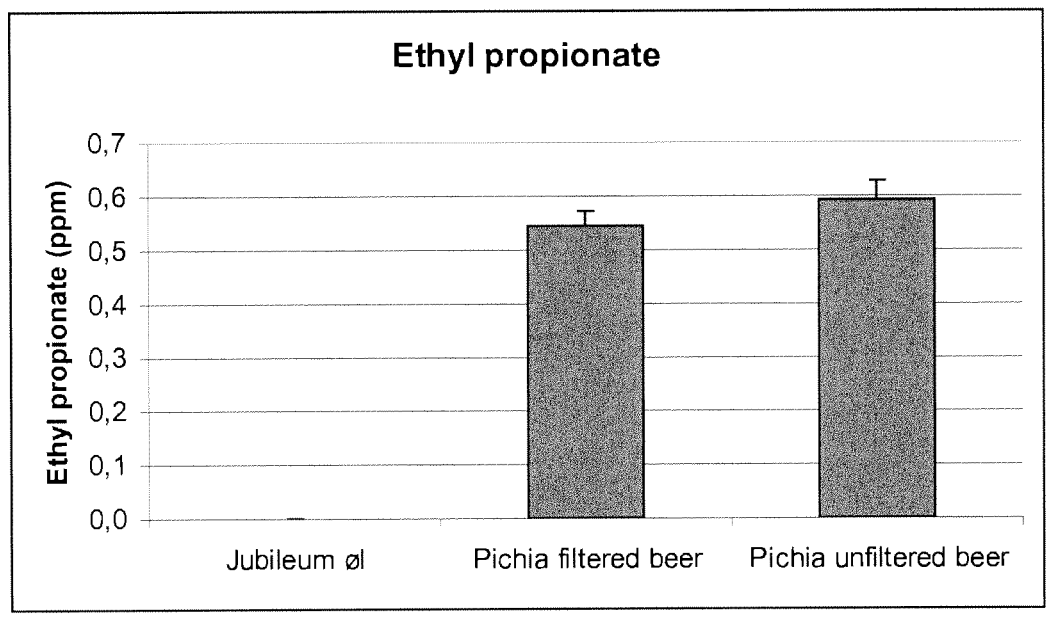
FIG. 30 illustrates ethyl propionate concentrations in finished beers.
Figure 31:
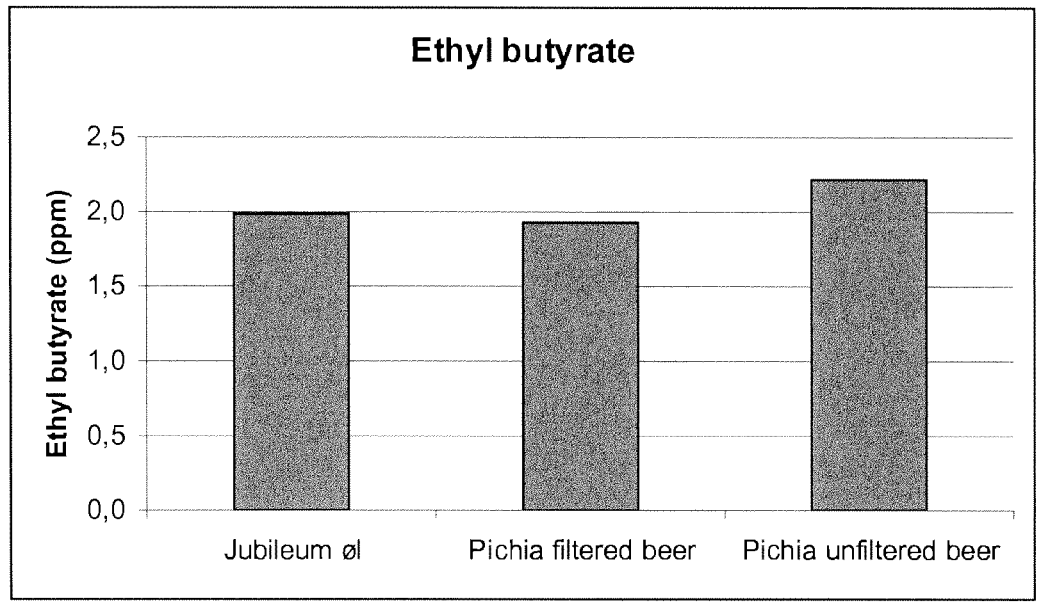
FIG. 31 illustrates ethyl butyrate concentrations in finished beers.
Figure 32:
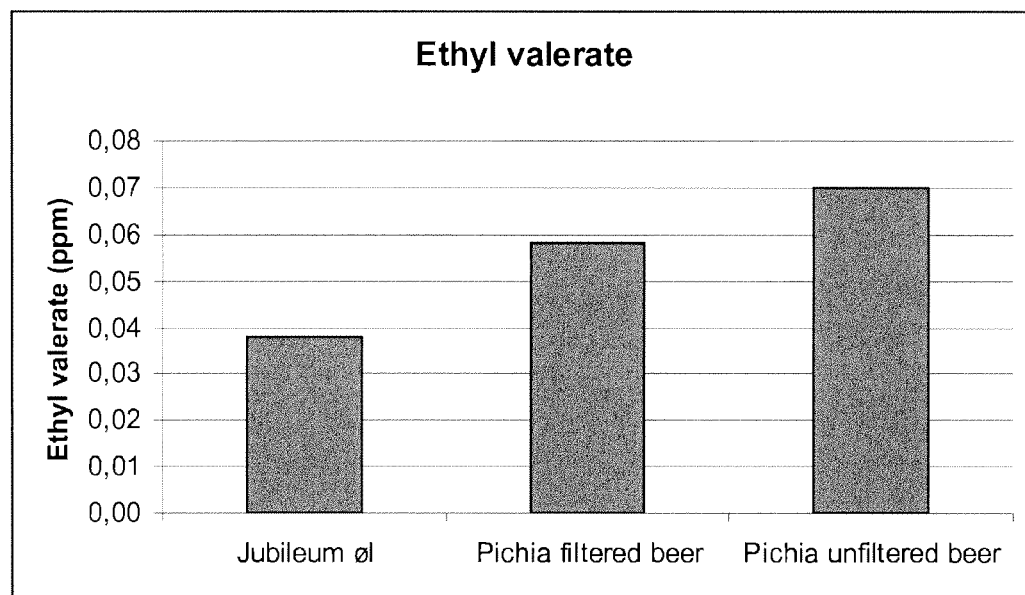
FIG. 32 illustrates ethyl valerate concentrations in finished beers.
Figure 33:
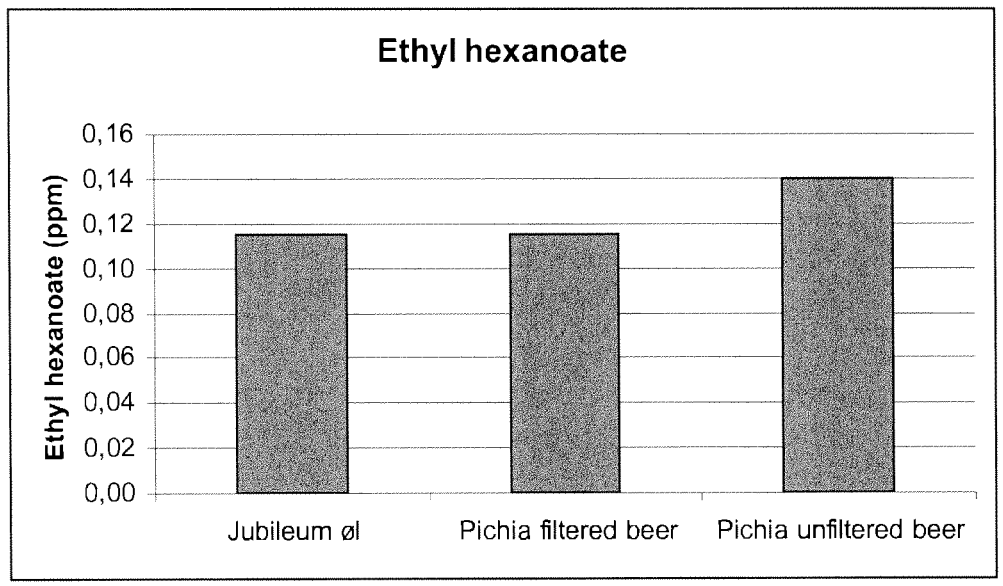
FIG. 33 illustrates ethyl hexanoate concentrations in finished beers.
Figure 34:
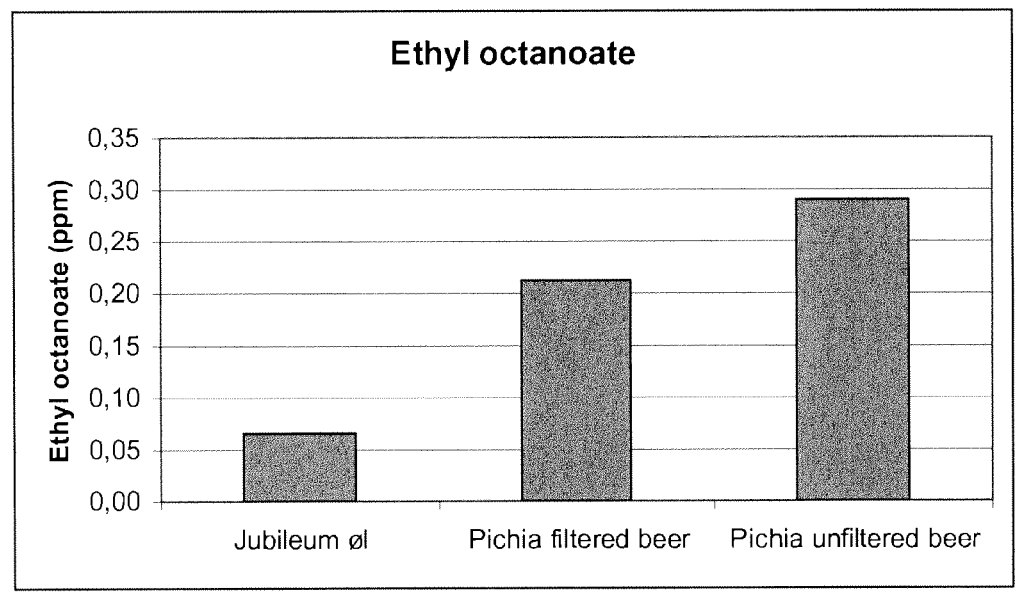
FIG. 34 illustrates ethyl octanoate concentrations in finished beers.
Figure 35:
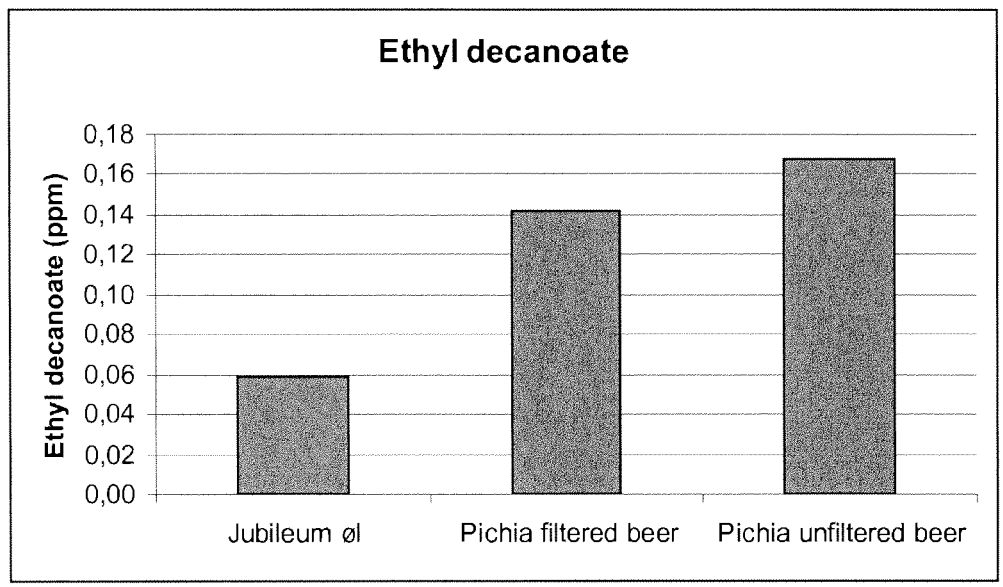
FIG. 35 illustrates ethyl decanoated concentrations in finished beers.
Figure 36:
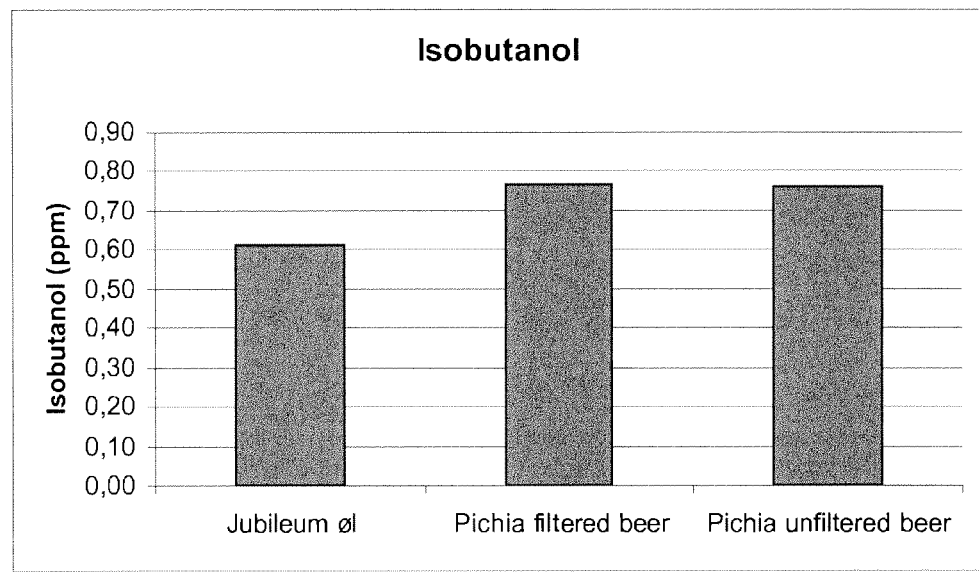
FIG. 36 illustrates isobutanol concentrations in finished beers.
Figure 37:
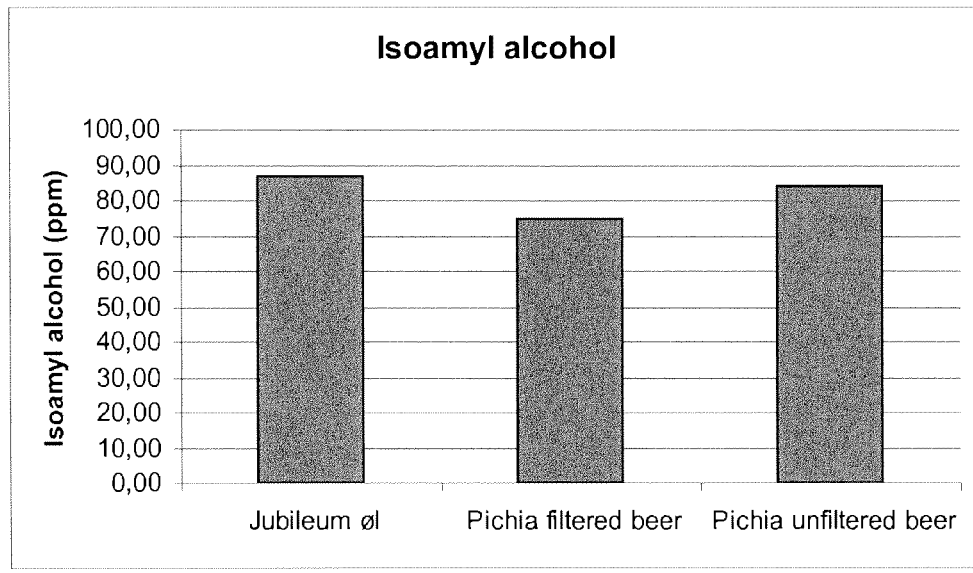
FIG. 37 illustrates isoamyl alcohol concentrations in finished beers.
Figure 38:
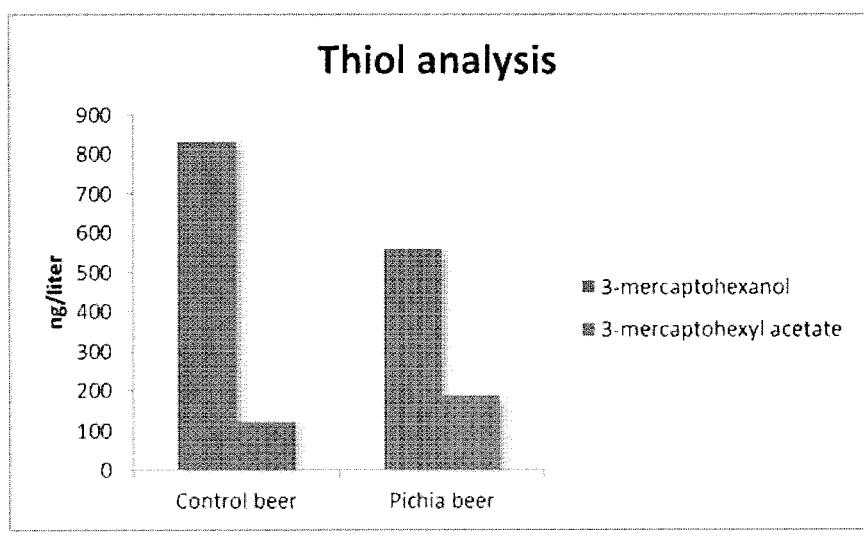
FIG. 38 illustrates concentrations of the thiols 3-mercaptohexanol and 3-mercaptohexyl acetate in beer prepared with and without *Pichia*.

The beer brewed with *Pichia* spp. contains a different flavor profile when different hop varieties are used. As an example, the ethyl decanoate level is at least 50% more increased when Saaz hop is used, compared to when Cascade, Nelson Sauvin or Amarillo is used and is at least 50% increased when Nelson Sauvin is used, compared to when Cascade or Amarillo is used in the fermentations performed at 20° C. (see FIG. 21). The ethyl valerate concentration is at least 50% increased when Cascade or Nelson Sauvin hop is used, compared to when Amarillo or Saaz is used in fermentations performed at 20° C. (see FIG. 15). The ethyl hexanoate and ethyl octanoate concentrations are at least increased with 15% when Cascade hops is used, compared to when Nelson Sauvin, Amarillo or Saaz hops are used in fermentations performed at 20° C. (see FIGS. 17 and 19).

It is also contemplated that the beer brewed using *Pichia* spp. will contain detectable amounts of thiols (in particular 3-mercaptohexyl acetate (3MHA) and 3-mercaptohexan-1-ol (3MH)) such as described for wine in WO 2009/110807.

EXAMPLES

Example 1

Materials and Methods

Fermentation Set-Up

Lab-scale fermentation trials were carried out in 500 ml of wort. The wort was prepared with wheat malt extract (Brewferm). The malt extract was mixed with water to reach an initial sugar content of 10° P. 4 times 3 liter wort was boiled with 4 different hop varieties: Nelson Sauvin, Amarillo, Saaz and Cascade. Hop pellets were added in a closed coffee filter to the wort and this was boiled for 30 min to extract the hop flavor and to add bitterness to the beer. Hop pellets were added to reach 23 EBU. After boiling, the coffee filter was removed from the wort and the wort was transferred to 1 L bottles, which were closed by water locks.

Per hop variety, 4 fermentations were carried out. Two fermentation temperatures were used: 20° C. and 22° C. Per fermentation temperature, 2 different inoculations were done: one bottle was inoculated with *Pichia kluyveri* PK-KR1 (for sequential inoculation) and the second bottle was inoculated with a commercial *Saccharomyces cerevisiae* wheat yeast strain, Safbrew WB-06 (Lesaffre) (control fermentation) according to the supplier recommendations. Both yeast strains were inoculated at 5 million cells per ml. Table 1 gives an overview of the fermentation set-up.

TABLE 1

| Fermentation set-up | | |
|---|---|---|
| 20° C./22° C. | Sequential inoculation | Control |
| Nelson Sauvin | 1 | 1 |
| Amarillo | 1 | 1 |
| Saaz | 1 | 1 |
| Cascade | 1 | 1 |

For the sequential inoculation, the wheat yeast strain (Safbrew WB-06) was inoculated after 2 days to the *Pichia kluyveri* inoculated ferments to complete the fermentation. All fermentations were ended after 13 days. Samples were taken at day 5 and day 13.

Headspace GC-FID Analysis

Headspace gas chromatography coupled with flame ionisation detection (GC-FID) was used for the measurement of acetaldehyde, acetate esters, ethyl esters and higher alcohols in the fermentation products. Fermentation samples were centrifuged, after which 2 ml was collected in vials. Samples were then analyzed with a calibrated Perkin Elmer GC System with a headspace sampler. The GC was equipped with a DB-WAXETR column (length, 30 m; internal diameter, 0.25 mm; layer thickness, 0.5 μm; Agilent Technologies, Germany). The split-splitless injector was used and held at 180° C. Samples were heated for 30 min at 70° C. in the headspace autosampler before injection (needle temperature: 110° C.). Helium was used as the carrier gas. After starting at 60° C., the oven temperature was raised after 2 min from 60° C. to 230° C. at 45° C./min and was finally held at 230° C. for 5 min. During the GC-program a constant flow rate (10 mL/min) of the carrier gas (He) was maintained. The FID temperature was kept constant at 220° C. respectively. The results were analyzed with Turbochrom software.

Ethanol Analysis

Ethanol was measured with the Ethanol Enzymatic Bioanalysis kit of Boehringer Mannheim.

Results

Figure 2:
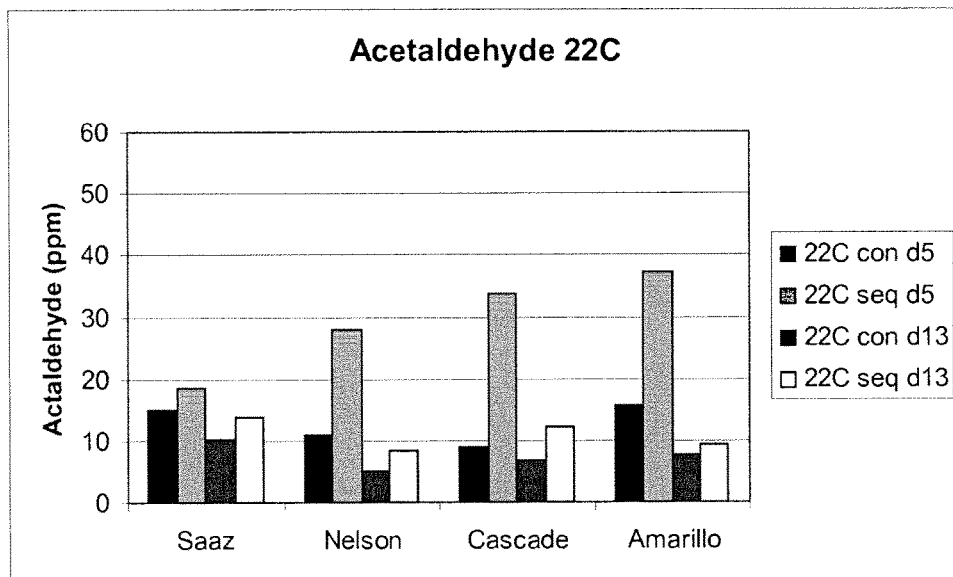
FIG. 2 illustrates acetaldehyde concentrations in fermentation products of sequential and control fermentations at 22° C., taken at day 5 (d5) and day 13 (d13). Con=control fermentation and seq=sequential fermentation.
Figure 3:
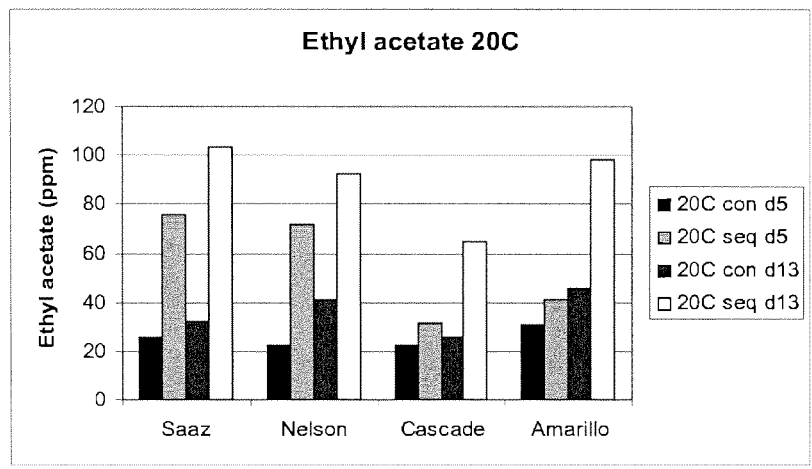
FIG. 3 illustrates ethyl acetate concentrations in fermentation products of sequential and control fermentations at 20° C., taken at day 5 (d5) and day 13 (d13). Con=control fermentation and seq=sequential fermentation.
Figure 4:
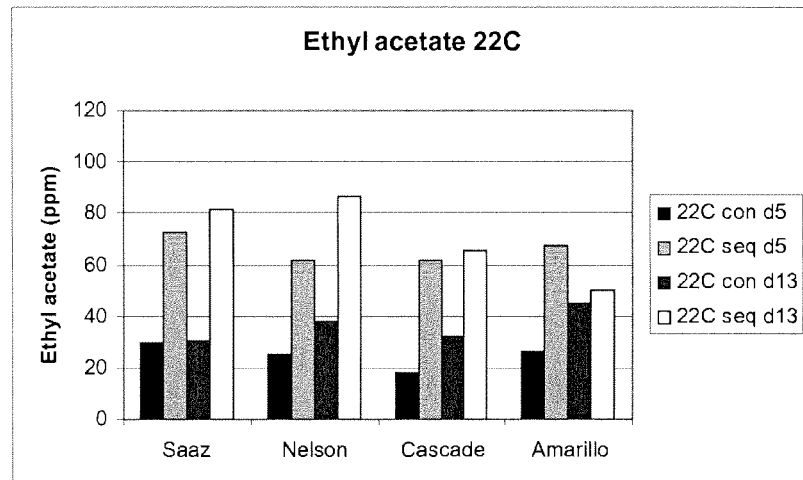
FIG. 4 illustrates ethyl acetate concentrations in fermentation products of sequential and control fermentations at 22° C., taken at day 5 (d5) and day 13 (d13). Con=control fermentation and seq=sequential fermentation.
Figure 5:
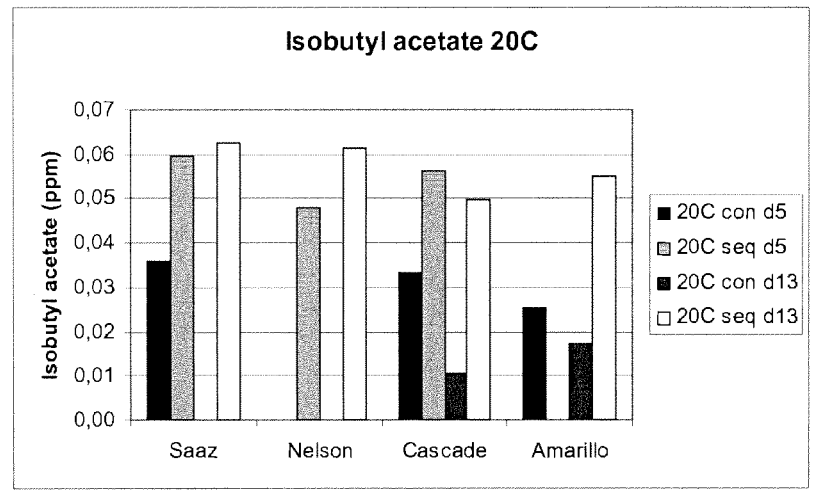
FIG. 5 illustrates isobutyl acetate concentrations in fermentation products of sequential and control fermentations at 20° C., taken at day 5 (d5) and day 13 (d13). Con=control fermentation and seq=sequential fermentation.
Figure 6:
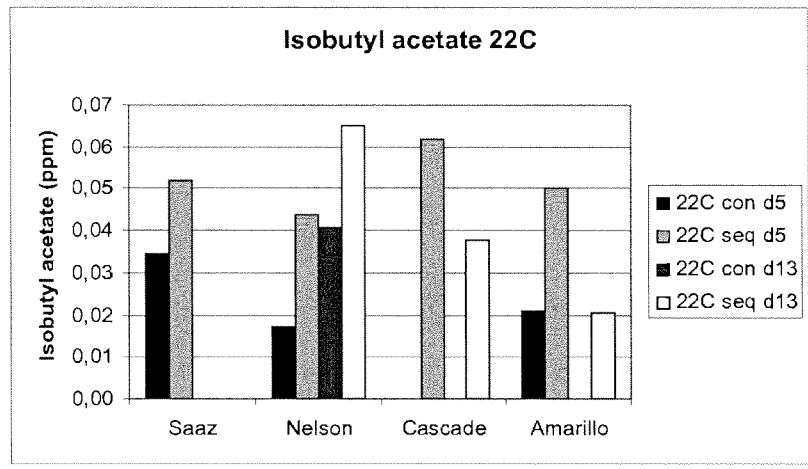
FIG. 6 illustrates isobutyl acetate concentrations in fermentation products of sequential and control fermentations at 22° C., taken at day 5 (d5) and day 13 (d13). Con=control fermentation and seq=sequential fermentation.
Figure 7:
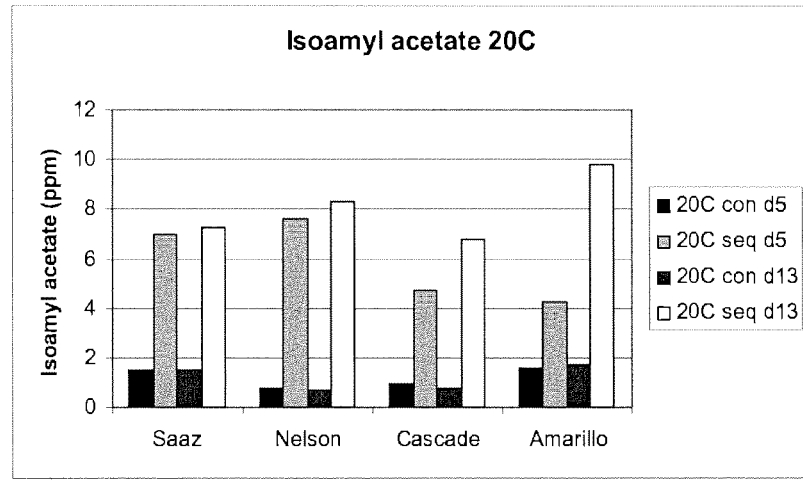
FIG. 7 illustrates isoamyl acetate concentrations in fermentation products of sequential and control fermentations at 20° C., taken at day 5 (d5) and day 13 (d13). Con=control fermentation and seq=sequential fermentation.
Figure 8:
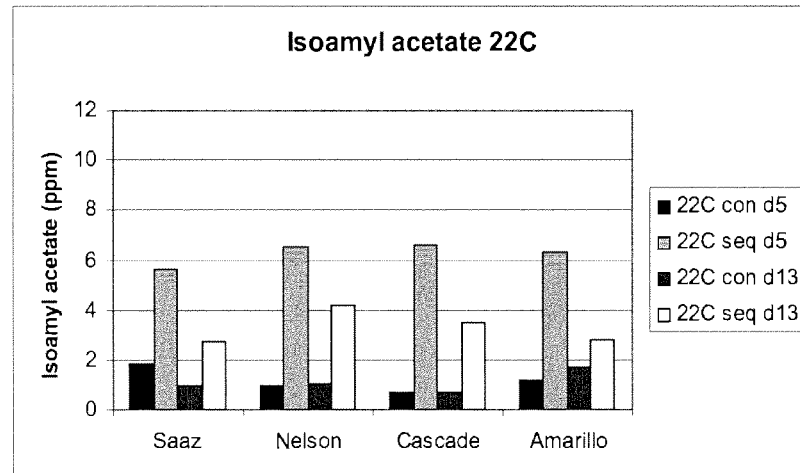
FIG. 8 illustrates isoamyl acetate concentrations in fermentation products of sequential and control fermentations at 22° C., taken at day 5 (d5) and day 13 (d13). Con=control fermentation and seq=sequential fermentation.
Figure 9:
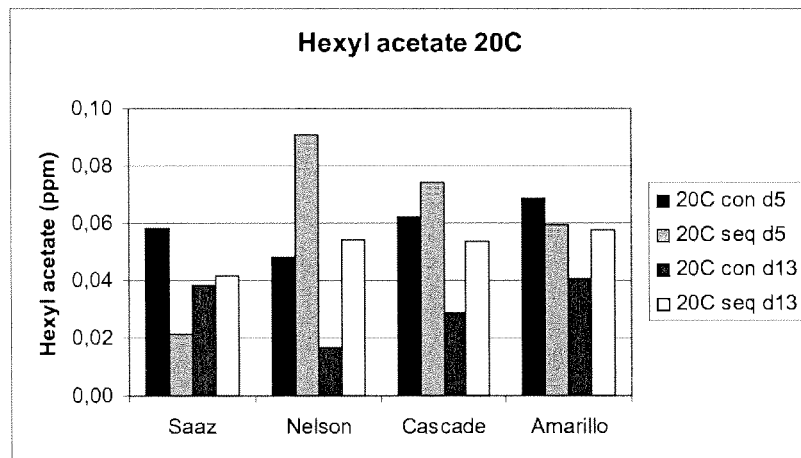
FIG. 9 illustrates hexyl acetate concentrations in fermentation products of sequential and control fermentations at 20° C., taken at day 5 (d5) and day 13 (d13). Con=control fermentation and seq=sequential fermentation.
Figure 10:
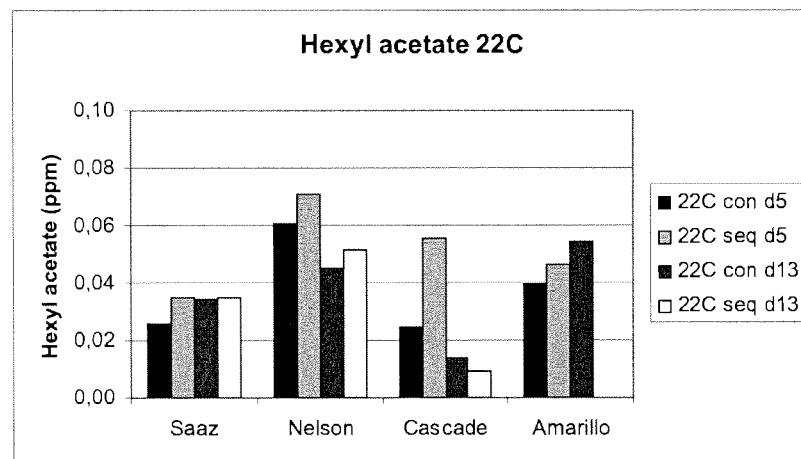
FIG. 10 illustrates hexyl acetate concentrations in fermentation products of sequential and control fermentations at 22° C., taken at day 5 (d5) and day 13 (d13). Con=control fermentation and seq=sequential fermentation.
Figure 11:
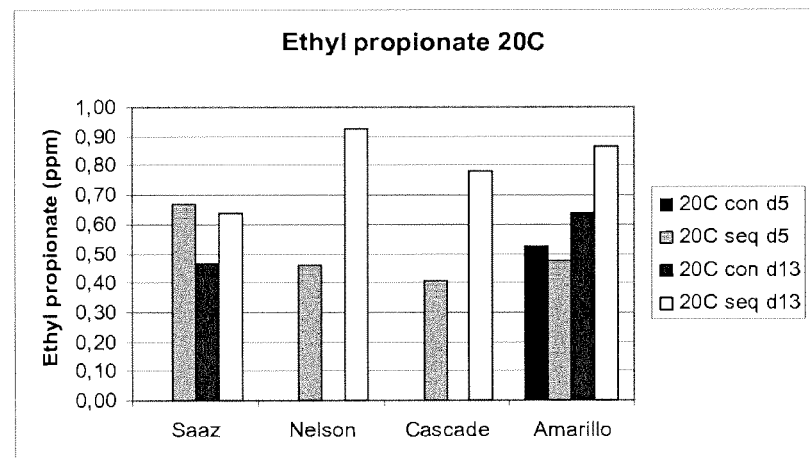
FIG. 11 illustrates ethyl propionate concentrations in fermentation products of sequential and control fermentations at 20° C., taken at day 5 (d5) and day 13 (d13). Con=control fermentation and seq=sequential fermentation.
Figure 12:
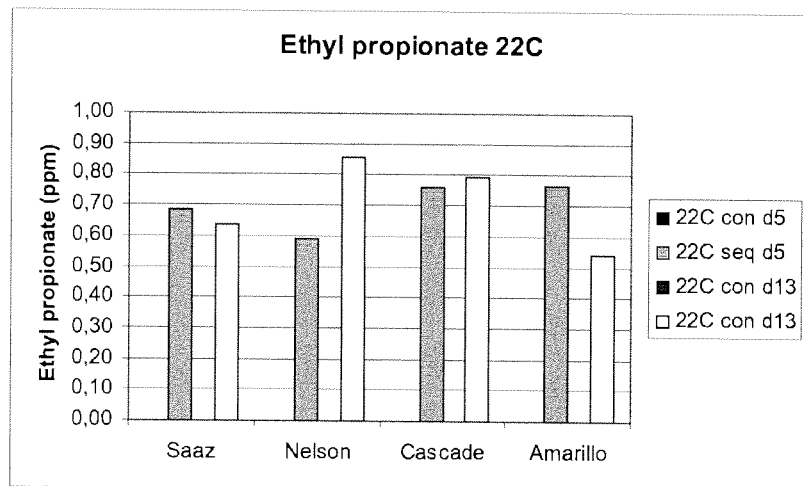
FIG. 12 illustrates ethyl propionate concentrations in fermentation products of sequential and control fermentations at 22° C., taken at day 5 (d5) and day 13 (d13). Con=control fermentation and seq=sequential fermentation.
Figure 13:
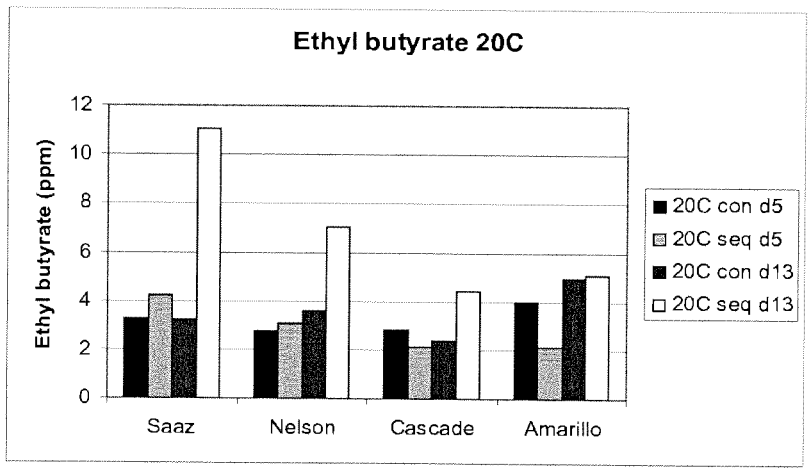
FIG. 13 illustrates ethyl butyrate concentrations in fermentation products of sequential and control fermentations at 20° C., taken at day 5 (d5) and day 13 (d13). Con=control fermentation and seq=sequential fermentation.
Figure 14:
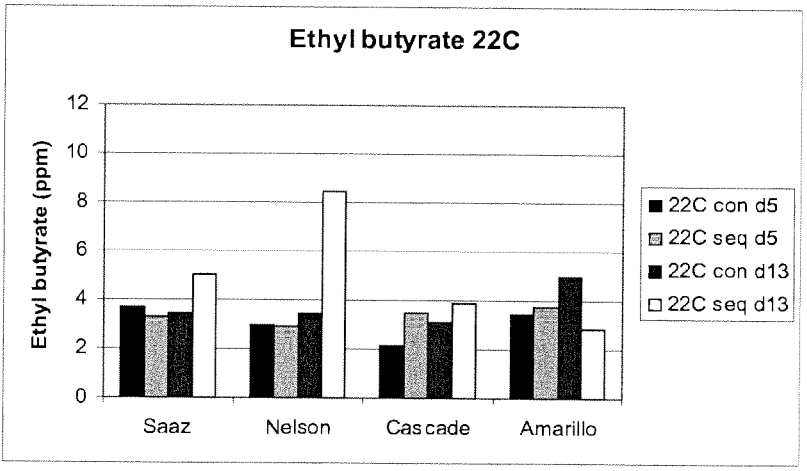
FIG. 14 illustrates ethyl butyrate concentrations in fermentation products of sequential and control fermentations at 22° C., taken at day 5 (d5) and day 13 (d13). Con=control fermentation and seq=sequential fermentation.

Lab-scale fermentations were carried out in wheat wort with different hop varieties and inoculated with *Pichia kluyveri* for 2 days, after which a *Saccharomyces cerevisiae* wheat beer yeast was added to investigate the effect of a sequential inoculation in combination with different hop varieties on beer flavor. As a control, fermentations with only *S. cerevisiae* wheat beer yeast were carried out. Both the sequential and control fermentations were stopped after 13 days. Samples were taken at day 5 and day 13 and subsequently analyzed for flavor compounds and ethanol concentration Flavor analysis of all the fermentation products was carried out with headspace GC-FID as described in Materials and Methods. Results are depicted in FIGS. 1 and 2 (aldehydes), FIG. 3-10 (acetate esters), FIG. 11-16 (short-chain ethyl esters), FIG. 17-22 (medium-chain ethyl esters) and FIG. 23-26 (higher alcohols).

Ethanol concentrations were measured with a kit (see Materials and Methods). The results of the ethanol concentrations are shown in Table 2.

TABLE 2

Ethanol concentrations of the fermentation products at day 13 of the sequential and control fermentations at 20° C. and 22° C.

|  | 20° C. | 22° C. |
| --- | --- | --- |
| Saaz con | 2.9 | 3.1 |
| Saaz seq | 3.3 | 3.4 |
| Nelson Sauvin con | 3.5 | 3.5 |
| Nelson Sauvin seq | 3.7 | 3.3 |
| Cascade con | 3.7 | 3.3 |
| Cascade seq | 3.6 | 3.0 |
| Amarillo con | 4.0 | 4.2 |
| Amarillo seq | 3.8 | 3.6 | con = control fermentation,
seq = sequential fermentation

CONCLUSION

Sequential inoculation with *Pichia kluyveri* as the first and a *Saccharomyces cerevisiae* beer yeast as the second yeast strain in 500 ml small-scale wheat beer fermentations with different hop varieties showed remarkable flavor differences per hop variety, compared to a 'normal' control beer fermentation with only a *S. cerevisiae* beer yeast. This is the first time it is shown that a sequential inoculation with *Pichia kluyveri* and *Saccharomyces cerevisiae* has a flavor enhancement effect in beer fermentations. Moreover, differences in flavor profile could be seen for all flavor compounds measured when different hop varieties are used.

Acetaldehyde concentrations were always higher in the sequential inoculation, compared to the control fermentation (see FIG. 1-2). However, at the end of fermentation, similar values are obtained for both the sequential and control fermentation. As brewers don't want too high concentrations of this compound in the beer, the effect of the sequential inoculation is negligible.

The highest flavor differences were found for esters. If we look closer to the acetate ester concentrations, especially the concentration of isoamyl acetate, which is a desirable fruity flavor compound, was highly increased in the sequential inoculation, compared to the control. Fermentation at 20° C. seemed to be more beneficial then fermentation at 22° C. The concentration was highest in the fermentation with addition of Amarillo hop.

Also isobutyl acetate concentrations were highly increased in the sequential fermentations. Fermentation at 20° C. was again better for the production of this compound than fermentation at 22° C.

Ethyl acetate, which is a negative compound at high concentrations, but easily masked by other acetate esters, was increased as well in the sequential fermentations, but only two times the amount, compared to the controls. The fermentation with Cascade hop produced the less ethyl acetate of all the fermentations.

Hexyl acetate increased only a little bit in all the sequential fermentations, compared to the control fermentations.

The short-chain ethyl esters gave the most striking results, as ethyl propionate and ethyl valerate were totally not are almost not produced in the control fermentation. However, high concentrations were reached with the sequential fermentations (up to 1 ppm). For ethyl butyrate, only an effect was seen with addition of Saaz and Nelson Sauvin hop for the sequential fermentations.

Concentrations of ethyl hexanoate and octanoate were only enhanced in the sequential fermentations with the addition of Cascade hops. However, for ethyl decanoate, the concentrations were much higher in the sequential fermentations with addition of Saaz and Nelson Sauvin hops. The difference between the control and the sequential fermentations were more than 10-fold.

The higher alcohols are the only compounds of which the concentrations did not increase significantly in the sequential fermentations, compared to the control fermentations.

Example 2

A large-scale brewing trial was performed at a brewery to investigate the possibility of using *Pichia kluyveri* for the brewing industry, especially with regard to flavor.

Materials and Methods

Fermentation Procedure

The control beer and *Pichia* beer were made on a 15 HL scale in a brewery. The wort consisted of malt varieties typical for a pale ale beer, and the hop variety used was Cascade. 15 hl of wort was used to inoculate the *Pichia kluyveri* PK-KR1. Inoculation rate was calculated to be between 1-2 million cells per ml. Every day, a sample was taken for measurement of cell counts (see Table 3) and flavor analysis was performed on the final beer.

TABLE 3

Cell count of *Pichia kluyveri* PK-KR1 during the first 3 days of fermentation.

| Day | Cell count |
| --- | --- |
| 0 | 2.00E+06 |
| 1 | 2.00E+06 |
| 2 | 1.00E+07 |
| 3 | 7.00E+05 |

At day 3, the normal brewing yeast was added (London Ale yeast from White Labs). The yeast was already used for making one beer and should therefore be optimal for this brew (2nd generation). The yeast was added while flushing air through the brew. Therefore, it was possible to have an idea of the smell of the brew while the brewing yeast was added. The smell was very fruity (banana, pineapple-like).

Fermentation was carried out until the sugar had been completely assimilated by the yeast.

After that, the green beer was matured at 7-8° C. for at least a week.

At day 8, the fermentation was completed and the fermentation temperature was lowered to 8° C. After fermentation, the beer matured for 7 days with the yeast still in the fermentor. At day 15, the yeast was taken out and the temperature was decreased to 2° C. After another three weeks, the beer was filtered, pasteurized and put into bottles.

Flavor Analysis

Headspace gas chromatography coupled with flame ionization detection (GC-FID) was used for the measurement of acetaldehyde, acetate esters, ethyl esters and higher alcohols in the fermentation products. Fermentation samples were centrifuged, after which 2 ml was collected in vials. Samples were then analyzed with a calibrated Perkin Elmer GC System with a headspace sampler. The GC was equipped with a DB-WAXETR column (length, 30 m; internal diameter, 0.25 mm; layer thickness, 0.5 µm; Agilent Technologies, Germany). The split-splitless injector was used and held at 180° C. Samples were heated for 30 min at 70° C. in the headspace autosampler before injection (needle temperature: 110° C.). Helium was used as the carrier gas. After starting at 60° C., the oven temperature was raised after 2 min from 60° C. to 230° C. at 45° C./min and was finally held at 230° C. for 5 min. During the GC-program a constant flow rate (10 mL/min) of the carrier gas (He) was maintained. The FID temperature was kept constant at 220° C. respectively. The results were analyzed with Turbochrom software.

Thiol Analysis

Thiol analyses were carried out by Hill Laboratories, Hamilton, New Zealand. Two compounds were measured: 3-mercaptohexan-1-ol (rubarb, exotic fruit) and 3-mercaptohexyl acetate (passion fruit).

Results

Flavor analysis of finished product was done on three samples: 1) the control beer=Jubilæum ø1, 2) the filtered beer and 3) the unfiltered beer (see FIGS. 27 to 38). The flavor analysis clearly shows that the beer fermented with the *Pichia kluyveri* has increased concentrations of flavor compounds. Especially, the esters isoamyl acetate (FIG. 29), ethyl propionate (FIG. 30), ethyl valerate (FIG. 32), ethyl octanoate (FIG. 34) and ethyl decanoate (FIG. 35) are increased in high amounts. These esters are responsible for the fruity flavors in beers and are therefore of major importance. These results also show that production of beer on a big production scale (15 HL), which is a huge increase in scale coming from lab-scale, confirms the increase in fruitiness in the beer. That means that breweries can use the *Pichia kluyveri* in production-scale brewing and still be sure of the effect of the yeast on the beer.

The control and *Pichia* beer were also analyzed for thiol flavor compounds. Two compounds were measured: 3-mercaptohexanol (rubarb, exotic fruit) and 3-mercaptohexyl acetate (passion fruit) (see FIG. 38). This is the first time that it is documented that *Pichia kluyveri* can convert 3-mercaptohexanol to 3-mercaptohexyl acetate in beer, and this to a large extent. As can be seen from FIG. 38, *Pichia kluyveri* uses 3-mercaptohexan-1-ol to produce 3-mercaptohexyl acetate, and this to a bigger extent than when only a *Saccharomyces* brewing yeast strain was used (control beer).

DEPOSITS

The *Pichia kluyveri* PK-KR1 and PK-KR2 strains were deposited on 24 Aug. 2006 at the National Measurement Institute, 51-65 Clarke Street, South Melbourne, Victoria 3205, Australia, by University of Auckland, School of Biological Sciences, Auckland 1142, New Zealand, and given the accession numbers V06/022711 and V06/022712, respectively, as described in WO 2009/110807.

REFERENCES

Daenen L, Saison D, Sterckx F, Delvaux F R, Verachtert H, and Derdelinckx G. (2008) Screening and evaluation of the glucoside hydrolase activity in *Saccharomyces* and *Brettanomyces* brewing yeasts. J Appl Microbiol 104: 478-488.

Domizio P, Romani C, Lencioni L, Comitini F, Gobbi M, Mannazzu I, and Ciani M. (2011) Outlining a future for non-*Saccharomyces* yeasts: selection of putative spoilage wine strains to be used in combination with *Saccharomyces cerevisiae* for grape juice fermentation. Int J Food Microbiol. 147:170-80.

King A J, and Dickinson R J. (2003) Biotransformation of hop aroma terpenoids by ale and lager yeasts. FEMS Yeast Res 3:53-62.

Saerens S M G, Duong C T, and Nevoigt E. (2010) Genetic improvement of brewer's yeast: current state, perspectives and limits. Appl Microbiol Biotechnol 86:1195-1212.

Takoi K, Koie K, Itoga Y, Katayama Y, Shimase M, Nakayama Y, and Watari J. (2010) Biotranformation of hop-derived monoterpene alcohols by lager yeast and their contribution to the flavour of hopped beer. J Agric Food Chem 58:5050-5058.

Verachtert H, Kumara H M C, Dawoud E (1989) Yeast in mixed cultures with emphasis on Iambic beer brewing. In:

Verachtert H, De Mot R (eds) Yeast—biotechnology and biocatalysis. Dekker, New York, pp 429-478.

Verstrepen K J, Derdelinckx G, Dufour J P, Winderickx J, Thevelein J M, Pretorius I S, and Delvaux F R. (2003) Flavor-active esters: adding fruitiness to beer. J Biosci Bioeng 96:110-118.

Zufall C, and Wackerbauer K (2000) Process engineering parameters for the dealcoholisation of beer by means of falling film evaporation and its influence on beer quality. Monatsschrift für Brauwissenschaft 53:124-137.

WO 2008/077986
WO 2009/110807
DD 288619

The invention claimed is:

1. A method of brewing beer comprising the steps of
(a) adding at least one hop variety to a wort to obtain a hopped wort;
(b) fermenting the hopped wort with a first yeast strain, wherein the first yeast strain is a *Pichia kluyveri* yeast strain; and
(c) fermenting the hopped wort with a second yeast strain to obtain a beer, wherein the second yeast strain belongs to the genera *Saccharomyces* or *Brettanomyces*,
wherein the use of a *Pichia kluyveri* yeast strain in step (b):
increases the content of at least one flavor compound selected from the group consisting of isoamyl acetate, isobutyl acetate, ethyl propionate, ethyl valerate, ethyl octanoate and ethyl decanoate by at least 50% as compared to a beer produced via a comparable method but without the use of the *Pichia kluyveri* yeast strain, and/or
increases the content of the thiol 3 mercaptohexyl acetate by at least 10% as compared to a beer produced via a comparable method but without the use of the *Pichia kluyveri* yeast strain.

2. The method according to claim 1, wherein steps (b) and (c) are carried out sequentially.

3. The method according to claim 2, wherein the fermenting in step (b) is for at least 12 hours prior to the onset of step (c).

4. The method according to claim 1, wherein step (b) and step (c) are carried out at the same time by co-inoculation with the first yeast strain and the second yeast strain.

5. The method according to claim 1, wherein the fermenting in step (c) is for at least 24 hours.

6. The method according to claim 1, wherein the at least one hop variety is selected from the group consisting of Saaz, Nelson Sauvin, Cascade and Amarillo.

7. The method according to claim 1, wherein the fermenting in step (b) is carried out at between about 12° C. and 28° C.

8. The method according to claim 7, wherein the fermenting in step (b) is carried out at between about 20° C. and 22° C.

9. The method according to claim 1, wherein the *Pichia Kluyveri* strain is selected from *Pichia kluyveri* PK-KR1 with accession number V06/022711, *Pichia kluyveri* PK-KR2 with accession number V06/022712, and mutants of either of these.

10. The method according to claim 1, wherein the second yeast strain is selected from the group consisting of *Saccharomyces cerevisiae, Saccharomyces pastorianus* and *Brettanomyces bruxellensis*.

11. The method according to claim 1, wherein the beer is a low-alcohol, reduced-alcohol or non-alcohol beer.

12. The method according to claim 1, wherein when the hop variety is any variety selected from the group consisting of Ahtanum, Amarillo, Apollo, Cascade, Centennial, Chinook, Citra, Cluster, Columbus, Crystal, Eroica, Galena, Glacier, Greenburg, Horizon, Liberty, Millenium, Mount Hood, Mount Rainier, Previously Presentedport, Nugget, Palisade, Santiam, Simcoe, Sterling, Summit, Tomahawk, Ultra, Vanguard, Warrior, Willamette, Zeus, Admiral, Brewer's Gold, Bullion, Challenger, First Gold, Fuggles, Goldings, Herald, Northdown, Northern Brewer, Phoenix, Pilot, Pioneer, Progress, Target, Whitbread Golding Variety (WGV), Hallertau, Hersbrucker, Saaz, Tettnang, Spalt, Feux-Coeur Francais, Galaxy, Green Bullet, Motueka, Nelson Sauvin, Pacific Gem, Pacific Jade, Pacifica, Pride of Ringwood, Riwaka, Southern Cross, Lublin, Magnum, Perle, Polnischer Lublin, Saphir, Satus, Select, Strisselspalt, Styrian Goldings, Tardif de Bourgogne, Tradition, Bravo, Calypso, Chelan, Comet, El Dorado, San Juan Ruby Red, Satus, Sonnet Golding, Super Galena, Tillicum, Bramling Cross, Pilgrim, Hallertauer Herkules, Hallertauer Magnum, Hallertauer Taurus, Merkur, Opal, Smaragd, Halleratau Aroma, Kohatu, Rakau, Stella, Sticklebract, Summer Saaz, Super Alpha, Super Pride, Topaz, Wai-iti, Bor, Junga, Marynka, Premiant, Sladek, Styrian Atlas, Styrian Aurora, Styrian Bobek, Styrian Celeia, Sybilla and Sorachi Ace, and
the use of the *Pichia* spp. yeast strain in step (b) results in a flavor profile or levels of the flavor compounds isoamyl acetate, isobutyl acetate, ethyl propionate and ethyl valerate which is different from a flavor profile resulting from use of the *Pichia* spp. yeast strain in step (b) when the hop variety in step (b) is any other variety selected from the group consisting of Ahtanum, Amarillo, Apollo, Cascade, Centennial, Chinook, Citra, Cluster, Columbus, Crystal, Eroica, Galena, Glacier, Greenburg, Horizon, Liberty, Millenium, Mount Hood, Mount Rainier, Previously Presentedport, Nugget, Palisade, Santiam, Simcoe, Sterling, Summit, Tomahawk, Ultra, Vanguard, Warrior, Willamette, Zeus, Admiral, Brewer's Gold, Bullion, Challenger, First Gold, Fuggles, Goldings, Herald, Northdown, Northern Brewer, Phoenix, Pilot, Pioneer, Progress, Target, Whitbread Golding Variety (WGV), Hallertau, Hersbrucker, Saaz, Tettnang, Spalt, Feux-Coeur Francais, Galaxy, Green Bullet, Motueka, Nelson Sauvin, Pacific Gem, Pacific Jade, Pacifica, Pride of Ringwood, Riwaka, Southern Cross, Lublin, Magnum, Perle, Polnischer Lublin, Saphir, Satus, Select, Strisselspalt, Styrian Goldings, Tardif de Bourgogne, Tradition, Bravo, Calypso, Chelan, Comet, El Dorado, San Juan Ruby Red, Satus, Sonnet Golding, Super Galena, Tillicum, Bramling Cross, Pilgrim, Hallertauer Herkules, Hallertauer Magnum, Hallertauer Taurus, Merkur, Opal, Smaragd, Halleratau Aroma, Kohatu, Rakau, Stella, Sticklebract, Summer Saaz, Super Alpha, Super Pride, Topaz, Wai-iti, Bar, Junga, Marynka, Premiant, Sladek, Styrian Atlas, Styrian Aurora, Styrian Bobek, Styrian Celeia, Sybilla and Sorachi Ace.

* * * * *